(12) United States Patent
Roux

(10) Patent No.: US 12,511,447 B1
(45) Date of Patent: Dec. 30, 2025

(54) METHODS AND SYSTEMS FOR PERFORMING SHAPE OPTIMIZATION USING PHYSICS INFORMED BASIS FUNCTION

(71) Applicant: ANSYS, Inc., Canonsburg, PA (US)

(72) Inventor: Willem Jacobus Roux, Livermore, CA (US)

(73) Assignee: ANSYS, INC., Canonsburg, PA (US)

( * ) Notice: Subject to any disclaimer, the term of this patent is extended or adjusted under 35 U.S.C. 154(b) by 1085 days.

(21) Appl. No.: 17/321,217

(22) Filed: May 14, 2021

(51) Int. Cl.
*G06F 30/10* (2020.01)
*G06F 30/20* (2020.01)
*G06F 30/23* (2020.01)
*G06F 111/04* (2020.01)
*G06F 111/10* (2020.01)

(52) U.S. Cl.
CPC .............. *G06F 30/10* (2020.01); *G06F 30/20* (2020.01); *G06F 30/23* (2020.01); *G06F 2111/04* (2020.01); *G06F 2111/10* (2020.01)

(58) Field of Classification Search
CPC .......... G06F 30/20; G06F 30/23; G06F 30/25; G06F 30/367; G06F 30/398; G06F 30/10; G06F 2111/04; G06F 2111/10
USPC .............................................................. 703/1
See application file for complete search history.

(56) References Cited

U.S. PATENT DOCUMENTS 7,428,713 B1 * 9/2008 Roux .................. G06F 30/23
716/132

FOREIGN PATENT DOCUMENTS

CN 110210130 A * 9/2019 .............. G06F 17/11

OTHER PUBLICATIONS

Roux, Willem, The LS-TaSC (TM) Multipoint Method for Constrained Topology Optimization (Year: 2016).*
Roux, Willem, A spatial kernel approach for topology optimization (Year: 2020).*
Kiendl, J., Isogeometric shape optimization of shells using semi-analytical sensitivity analysis and sensitivity weighting (Year: 2014).*
Willem Roux, "A spatial kernel approach for topology optimization" (Year: 2020).*
D. A. Masters, "Geometric Comparison of Aerofoil Shape Parameterization Methods" (Year: 2017).*

(Continued)

*Primary Examiner* — John E Johansen
(74) *Attorney, Agent, or Firm* — Douglas A. Gastright

(57) ABSTRACT

A model representing a physical object in a shape optimization according to a design objective, and a control point for altering a shape of the physical object are received. The shape is defined by a set of nodes in the model. Sibling models are generated from the model according to a perturbation scheme. The control point is perturbed with respective perturbed values for the sibling models. Each sibling model contains nodal location changes for the nodes. The nodal location changes are determined based on a respective shape function formulated according to a respective perturbed value at the control point and one or more simulated physical behaviors of the model. The model is updated to have an optimal value for the control point. The optimal value is identified from a relationship according to the design objective. The relationship correlates a physical characteristic of the sibling models to the respective perturbed values.

12 Claims, 28 Drawing Sheets

(56) References Cited

OTHER PUBLICATIONS

Ali Mehmani, "Concurrent surrogate model selection (COSMOS): optimizing model type, kernel function, and hyper-parameters" (Year: 2017).*

J. Kiendl, "Isogeometric shape optimization of shells using semi-analytical sensitivity analysis and sensitivity weighting" (Year: 2014).*

J. Kiendl et al. "Isogeometric shape optimization of shells using semi-analytical sensitivity analysis and sensitivity weighting", Jun. 2014 Computer Methods in Applied Mechanics and Engineering 274 DOI:10.1016/j.cma.2014.02.001.

* cited by examiner

Simply supported circular disk subject to a point load at center

752

(a)

(b)

850

852 — Receive a base design (e.g., FEA model) for a physical object and at least one control point for altering a shape in the base design, the shape is to be optimized according to a design objective 854 — Analyze the base design in a simulation (e.g., FEA)

856 — Determine a physics informed basis function from one or more simulated results of the base design 858 — Create a set of sibling designs by perturbing a respective location of each control point according to a perturbation scheme, the shape of each sibling design is created based on a respective perturbed value at the at a control point and the physics informed basis function

*FIG. 8F*

METHODS AND SYSTEMS FOR PERFORMING SHAPE OPTIMIZATION USING PHYSICS INFORMED BASIS FUNCTION

FIELD

The subject matter described herein relates to engineering design optimization, more particularly to methods and systems for performing shape optimization of a physical object using a physics informed basis function determined based on one or more simulated physical behaviors of a base design for the physical object.

BACKGROUND

Shape optimization is part of the field of structural optimization. The typical problem is to find the shape which is optimal in that it minimizes a certain cost function (i.e., design objective) while satisfying given constraint(s) (i.e., design constraint).

For an optimization problem, an objective function defines the objective of the optimization; a constraint imposes limitations on the optimization and defines a feasible design; geometric restrictions impose limitations on the topology or shape of the physical object that can be generated by the optimization; and stop conditions define when an optimization task is considered complete.

Optimizing a shape of a physical object (e.g., structure, product, part, etc.) requires knowing the effect of a shape change. For linear physical behaviors, this can be computed analytically. But for a physical object having highly nonlinear physical behaviors, it is infeasible to have an analytical function. The effect is computed in simulation through an analytical function for linear behaviors and through finite differences for nonlinear behaviors (e.g., using shapes as input).

SUMMARY

The disclosure describes methods and systems for performing shape optimization for a physical object using a physics informed basis function determined based on one or more simulated physical behaviors of a base design for the physical object.

In one aspect, a model is received in a computer system. The model representing a base design for a physical object in a shape optimization according to a design objective. Also received is a control point for altering a shape of a surface of the physical object. The surface is defined by a set of nodes in the model. Locations of the nodes define the shape. A physics informed basis function is determined from one or more simulated physical behaviors of the base design obtained in a simulation. A set of sibling models representing sibling designs for the physical object are created in a perturbation scheme that perturbs the control point with perturbed values. Each sibling model is created using the physics informed basis function and a respective perturbed value for the control point. Each sibling design corresponds to the respective perturbed value. The model representing the base design is updated using the physics informed basis function and an optimal value for the control point. The optimal value is identified in a relationship correlating a physical characteristic of the sibling designs to the perturbed values. Physical characteristic is obtained in a respective simulation using a corresponding sibling model. The updated model is checked to determine whether an optimization has reached.

In another aspect, creation of sibling models includes calculating a shape change to the model based on a basic shape change modified with a physics informed basis function normalized by a scale function. The basic shape change can be represented by a radial basis function with a center value adjusted to the respective perturbed value for the control point of each sibling model. The scale function can be represented by a radial basis function with a center value adjusted to the value of the physics informed basis function at the control point.

In still another aspect, a model is received in a computer system to represent a base design for a physical object in a shape optimization according to a design objective. Also received is a control point for altering a shape of the physical object. The shape is defined by a set of nodes in the model. A set of sibling designs are generated from the base design according to a perturbation scheme. The control point is perturbed with respective perturbed values for the sibling designs. Each sibling design is represented by a respective sibling model containing nodal location changes for the set of nodes. The nodal location changes are determined based on a respective shape function associated with the control point. The respective shape function is formulated according to a respective perturbed value at the control point and one or more simulated physical behaviors of the base design. The model is updated to represent an updated design having an optimal value for the control point. The optimal value is identified from a relationship according to the design objective. The relationship correlates a physical characteristic of the sibling designs to the respective perturbed values. The updated design is checked to determine whether an optimization has reached.

In yet another aspect, multiple control points are used for altering a shape of a surface in the shape optimization.

DESCRIPTION OF DRAWINGS

FIGS. 8F-8G collectively is a flow diagram illustrating a third example process of performing a shape optimization for a physical object;

DETAILED DESCRIPTION

Figure 1A:
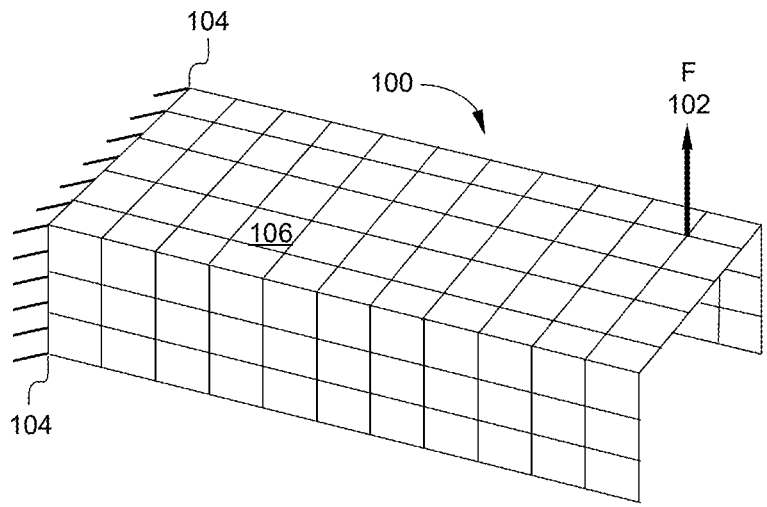
FIG. 1A-1B are diagrams depicting an example finite element analysis model representing a design for a physical object.

A base finite element analysis (FEA) model representing a base design for a physical object (e.g., structure, part, product, etc.) is received in a computer system. The base design contains a surface (e.g., outer surface) having a shape to be optimized according to a design objective in a shape optimization. The surface is formed by a set of nodes in the base FEA model. As a result, the shape is defined by locations of the set of nodes. The design objective can be a target physical characteristic (e.g., displacement) of the physical object. One example design objective is to minimize the displacement in the physical object.

At least one control point is also received for altering or changing the shape of the surface, each control node can be selected/chosen from the set of nodes that form the surface. The location of a respective control point in the base FEA model is referred to as a base or original location of the control point.

Simulated physical behaviors (e.g., structural responses) are obtained in a simulation (e.g., FEA) using the FEA model representing the base design. A physics informed basis function is then determined based on one or more simulated physical behaviors of the base design. As a result, the physics informed basis function possesses a physical correlation between nodes of the base FEA model specifically for the physical object. A shape change (i.e., nodal location changes in the base FEA model) derived from the physics informed basis function can be more realistic than that from a generic approximation function. Therefore, a shape optimization can be performed more efficiently to reach an optimal design when using physics informed basis function.

To perform the shape optimization, a set of sibling FEA model representing sibling designs for the physical object are generated based on a perturbation scheme. The perturbation scheme perturbs the base location of the control point with various perturbed values to corresponding perturbed locations. A respective sibling FEA model representing each sibling design is created by modifying the locations of the nodes in the base FEA model with a set of nodal location changes (i.e., shape change). The nodal location changes for each sibling FEA model are calculated based on a generic shape change function modified by the physical informed basis function normalized with a scale function. The generic shape change function is configured for matching the respective perturbed value at the respective control point and for approximating basic nodal location changes at the nodes that form the surface. The scale function is configured for matching the value of the physics informed basis function at the respective control point.

Corresponding simulations of all sibling designs are performed. A physical characteristic of each sibling design for the physical object is obtained in a respective simulation using a corresponding sibling FEA model. A relationship (e.g., surrogate model) can then be generated or constructed between the physical characteristic of the sibling designs and the perturbed values.

From the generated relationship, an optimal value that best meets the design objective (i.e., a target physical characteristic) is identified. The base FEA model is updated to create an updated model based on the optimal value. Creation of the updated FEA model is substantially similar to the creation of each sibling FEA model. Instead of using a respective perturbed value, the optimal value is used. The updated model can then be compared with the base model to determine whether the shape optimization has reached the goal (i.e., an optimal design based on predefined criteria.

Figure 1B:
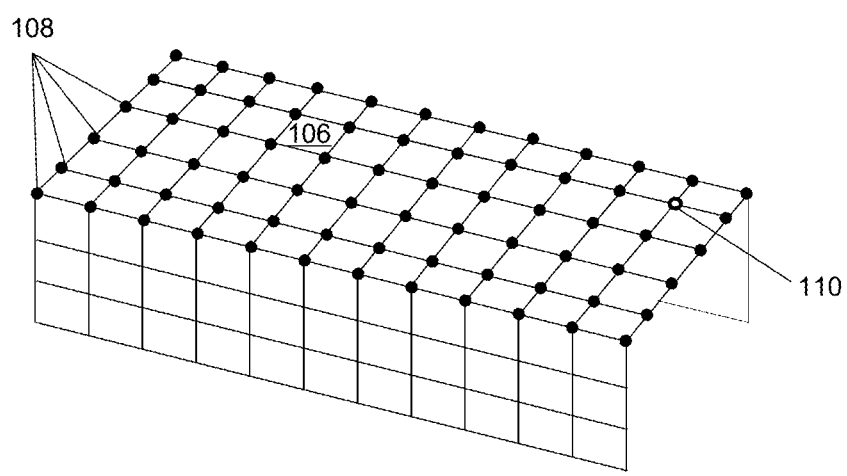

FIG. 1A shows a finite element analysis (FEA) model 100 representing a base design for an example physical object (e.g., a cantilever beam) to be used in a shape optimization. A point load F 102 is applied at a corner of one end and a fixed support 104 at the other end. Design objective is to minimize displacement at the location where the point load F 102 is applied. The base design contains a surface 106, which is formed by a set of nodes 108 shown as solid dots in FIG. 1B.

A simulation (e.g., an FEA) can be conducted using the FEA model 100 to obtain simulation results (i.e., simulated physical behaviors), for example, displacements, stresses, internal energy densities, etc. Based on one or more simulated physical behaviors, a physics informed basis function can be determined. The physics informed basis function can be based on one of the simulated physical behaviors. The physics informed basis function can also be a combination of the simulated physical behaviors. Since the physics informed basis function possesses a physical correlation specifically for the physical object, a shape change (i.e., nodal location changes in the FEA model) derived from the physics informed basis function can be more realistic than that from a generic approximation function.

The physic informed basis function incorporates results from a simulation (i.e., finite element analysis (FEA) or structural analysis) of the base design. In one embodiment, value of the physic informed basis function is the displacement magnitude at a location in the physical object. The displacement can be obtained/determined in the simulation (e.g., an FEA). In another embodiment, value of the physic informed basis function at a location can be a combination of two or more FEA results for that and related locations. The combination can be performed through a mathematical formula. Examples of the FEA results can be internal energy densities, principal stresses, displacements, etc. Examples of related locations include, but are not limited to, locations in proximity, locations correlated in physical response, or locations related in design intent. Additionally, the physics informed basis function can be a function of another physics informed basis function. Furthermore, the physics informed basis function can be a function of design sensitivity information obtained in a companion linear analysis. The design sensitivity information is the gradient of the design objective (e.g., minimizing displacement) with respect to the design variables (e.g., perturbed values of the control point).

A control point 110 can be one of the nodes 108 that form the surface 106. The surface 106 has a shape defined by locations of the set of nodes 108. The location of the control point 110 in the base design is referred to as an original location. In this example, the shape of the surface 106 is flat. For those having ordinary skill in the art would know that other shapes may be represented in an FEA model. The control point 110 can be used for altering or changing the shape of the surface 106 for a design derived from the base design, for example, a sibling design.

Sibling designs share the same parent design (i.e., base design) and the physics informed basis function, but not the locations of the control points. Sibling designs are chosen, determined, or created based on a perturbation scheme, for example, design of experiments, finite difference.

The first step to create a set of sibling FEA models representing sibling designs is to use a perturbation scheme for perturbing the control point 110 with different perturbed values. The control point 110 is perturbed to a first perturbed location 111 with a first perturbed value 112 along a direction 115 normal to the surface 106 at base location of the control point 110 shown in FIG. 1C. FIG. 1D shows a second perturbed location 113 of the control point 110 corresponding to a second perturbed value 114. Each sibling design corresponds to one of the perturbed values of the control point 110. Whereas only two sibling designs associated with two different perturbed locations of the control point is shown, there can be more than two sibling designs. In other words, there can be multiple perturbed values corresponding to multiple sibling design.

Figure 1C:
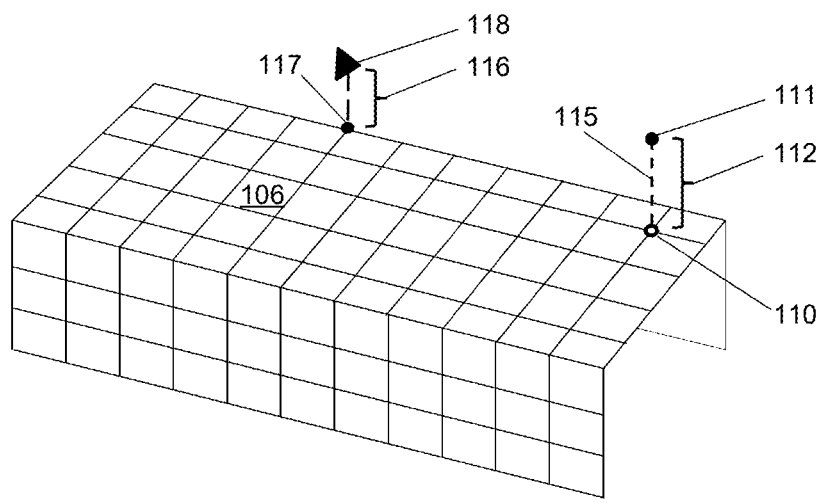
FIGS. 1C-1D are diagrams showing example perturbed values for one control point.
Figure 1D:
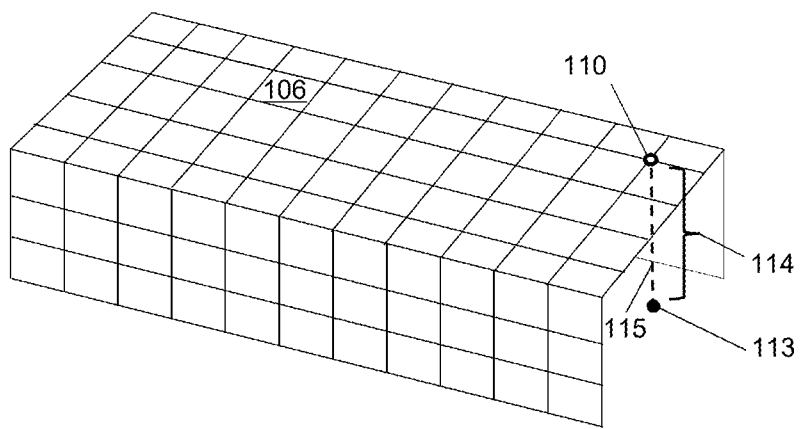

Perturbed value can be a positive number or a negative number to accommodate the situations shown in FIGS. 1C-1D. For example, the first sibling design corresponds to a first perturbed value (e.g., 1 mm), while the second sibling design corresponds to a second perturbed value (e.g., −1 mm). The first perturbed location is located 1 mm from the original location in a positive direction of the normal to the surface at the original location. The second perturbed location is located 1 mm from the original location in a negative direction of the normal. In another embodiment, there can be four sibling designs corresponding to a first perturbed value is 1.555, a second perturbed value is 2.2222, a third perturbed value is −2.111, and a fourth perturbed value is −1.123.

At this point, the only known information is the perturbed location of the control point in each sibling design. In order to create the shape of the surface 106 in each sibling FEA model, the locations of the nodes that form the surface 106 are unknown. The locations of the nodes in a sibling model can be determined by adding nodal location changes to the locations of the nodes in the base FEA model. As shown in FIG. 1C, the location 118 of an example node in a sibling model is determined by adding a nodal location change 116 to the original location 117. The nodal location changes (i.e., a shape change) can be calculated using Formula (1) as follows:

$$G_{ShapeChange}(X) = \frac{G_{PIBF}(X)}{G_{Scale}(X)} G_{ShapeChange}^{Generic}(X) \quad (1)$$

where:
X represents nodes (i.e., nodes that form the surface) in a base FEA model. $G_{PIBF}(X)$ is a physics informed basis function determined from one or more results (i.e., simulated physical behaviors) obtained in a simulation using the base FEA model.

$G_{Scale}(X)$ is a scale function for normalizing the physics informed basis function. The scale function is configured for matching the value of the physics informed basis function at the respective control point. In one embodiment, the scale function can be represented by a set of radial basis functions (RBFs), monomial basis functions and/or other applicable basis functions, for example, with one RBF per control point.

$$G_{ShapeChange}^{Generic}(X)$$

is a generic shape change function for providing basic shape change (i.e., basic nodal location changes) to the nodes that form the surface. The generic shape change function is configured for matching a value (e.g., a perturbed value) at a respective control point and for approximating the basic nodal location changes at the nodes. In one embodiment, the generic shape change function can be represented by another set of RBFs or other applicable basis functions.

$G_{ShapeChange}(X)$ is the shape change function for updating the shape (i.e., nodal location changes).

Radial Basis Function

A radial basis function (RBF) is a real-valued function φ whose value depends only on the distance between the input and some fixed point, either the origin, so that $\varphi(x)=\varphi(\|x\|)$, or some other fixed point c, called a center, so that $\varphi(x)=\varphi(\|x-c\|)$. Any function φ that satisfies the property $\varphi(x)=\varphi(\|x\|)$ is a radial function. The distance is usually Euclidean distance, although other metrics are sometimes used. They are often used as a collection $\{\varphi_k\}_k$ which forms a basis for some function space of interest. Sums of RBFs are typically used to approximate given functions.

When using only one control point for altering a shape in a shape optimization, the scale function can be a RBF with a weight equaling to the value of the physics informed basis function at the control point. The generic shape change function can be a RBF with a weight equaling to the perturbed value at the control point.

When there are multiple control points for altering the shape, the scale function can be configured as the following form: $\Sigma_p w_p \varphi_p(x)$, where $\varphi_p(x)$ is a RBF associated with control points p and $w_p$ is a weight for $\varphi_p(x)$. The unknown weights can be determined such that the scale function matches corresponding values of the physics informed basis function at control points. This can be achieved by solving the following formula $w=M^{-1}v$ and $m_{i,j}=\varphi_i(x_j)$ with the corresponding values v of the physics informed basis function at the respective center or origin of the RBFs, where w represents the unknown weights, M is a matrix having components $m_{i,j}=\varphi_i(x_j)$, with i and j are indices for the control points.

The generic shape change function can also be created substantially similar to the creation of the scale function. Instead of matching the corresponding values of the physics informed basis function at control points, corresponding perturbed values for the control points are matched. In one embodiment, the generic shape change function is formulated as shape function to interpolate or extrapolate perturbed values at the control points to the basic nodal location changes at the nodes that form the surface. Shape function is configured for interpolating the solution between discrete values at nodes of a mesh model.

Figure 1E:
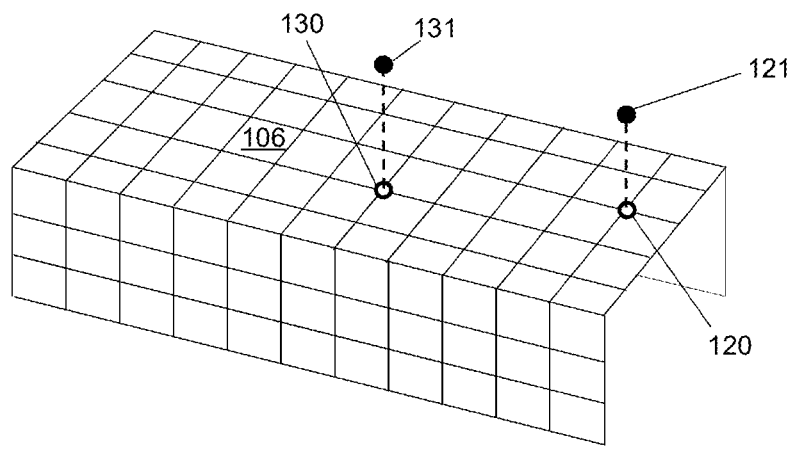
FIGS. 1E-1F are diagrams showing example perturbed values for two control points.
Figure 1F:
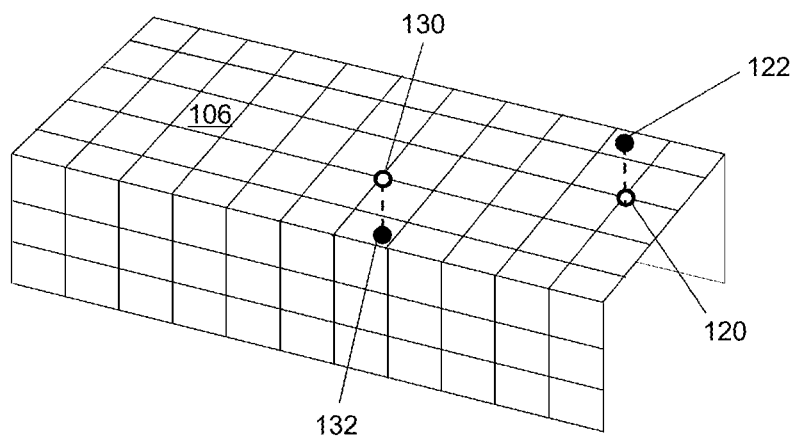

FIGS. 1E-1F show an example of using two control points (i.e., multiple control points) for altering the shape of the surface 106. In this example, both the first control point 120 and the second control point 130 are located on surface 106. FIG. 1E shows the first perturbed location 121 of the first control point 120, and the first perturbed location 131 of the second control point 130. FIG. 1F shows the second perturbed location 122 for the first control point 120, and the second perturbed location 132 of the second control point 130. Since each control point can be perturbed to multiple perturbed locations, multiple control points can lead to many different combinations/permutations.

To efficiently select a set of perturbed values for multiple control points can be done with a perturbation scheme such as design of experiments, finite difference.

Design of Experiments

The design of experiments (DOE) is the design of any task that aims to describe and explain the variation of information under conditions that are hypothesized to reflect the variation. The term is generally associated with experiments in which the design introduces conditions that directly affect the variation, but may also refer to the design of quasi-experiments, in which natural conditions that influence the variation are selected for observation.

In its simplest form, a design of experiments aims at predicting the outcome by introducing a change of the preconditions, which is represented by one or more independent variables, also referred to as "input variables" or "predictor variables." The change in one or more independent variables is generally hypothesized to result in a change in one or more dependent variables, also referred to as "output variables" or "response variables." The experimental design may also identify control variables that must be held constant to prevent external factors from affecting the results. Experimental design involves not only the selection of suitable independent, dependent, and control variables, but planning the delivery of the experiment under statistically optimal conditions given the constraints of available resources. There are multiple approaches for determining the set of design points (unique combinations of the settings of the independent variables) to be used in the experiment. Main concerns in experimental design include the establishment of validity, reliability, and replicability. For example, these concerns can be partially addressed by carefully choosing the independent variable, reducing the risk of measurement error, and ensuring that the documentation of the method is sufficiently detailed. Related concerns include achieving appropriate levels of statistical power and sensitivity.

Finite Difference

A finite difference is a mathematical expression of the form f(x+b)−f(x+a). If a finite difference is divided by b−a, one gets a difference quotient. The approximation of derivatives by finite differences plays a central role in finite difference methods for the numerical solution of differential equations, especially boundary value problems. The term "finite difference" is often taken as synonymous with finite difference approximations of derivatives, especially in the context of numerical methods.

Finite Element Analysis

Finite element analysis (FEA) is a computerized method widely used in industry to model and solve engineering problems relating to complex systems. FEA derives its name from the manner in which the geometry of the object under consideration is specified. With the advent of the modern digital computer, FEA has been implemented as FEA software. Basically, the FEA software is provided with a model of the geometric description and the associated material properties at each point within the model. In this model, the geometry of the system under analysis is represented by solids, shells and beams of various sizes, which are called elements. The vertices of the elements are referred to as nodes. The model is comprised of a finite number of elements, which are assigned a material name to associate with material properties. The model thus represents the physical space occupied by the object under analysis along with its immediate surroundings. The FEA software then refers to a table in which the properties (e.g., stress-strain constitutive equation, Young's modulus, Poisson's ratio, thermo-conductivity) of each material type are tabulated. Additionally, the conditions at the boundary of the object (i.e., loadings, physical constraints, etc.) are specified. In this fashion a model of the object and its environment is created.

Figure 2:
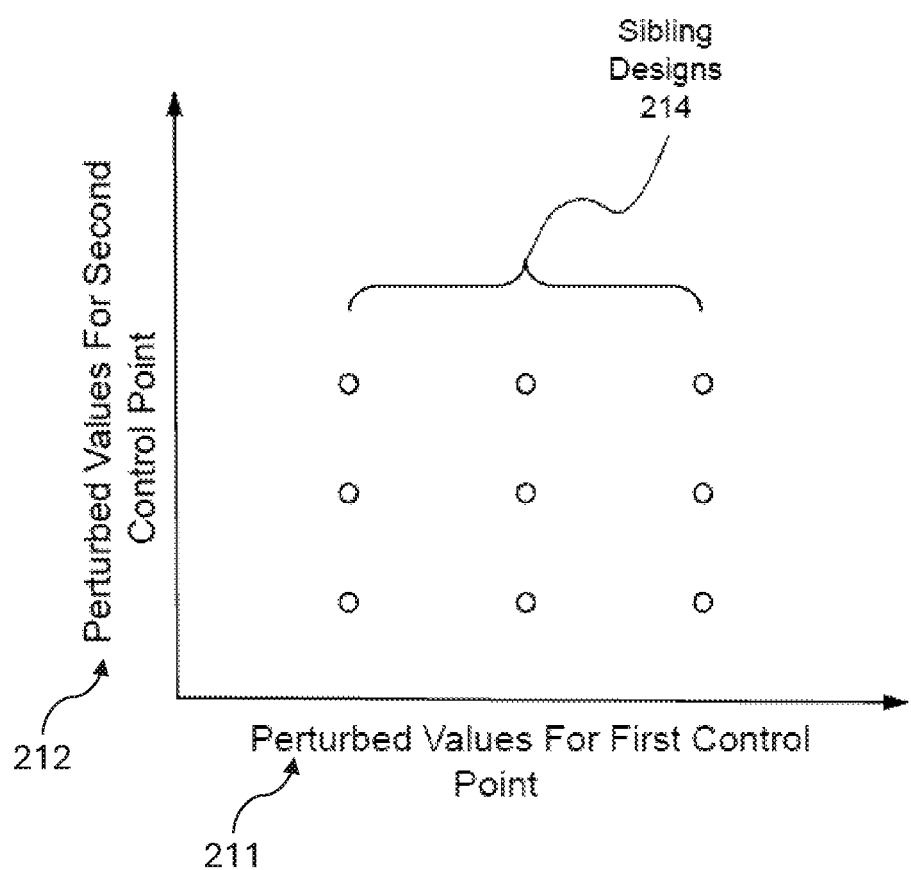
FIG. 2 is a diagram showing an example design space defined by perturbed values for two control points.

Perturbed values for each control point can be treated as independent design variable. FIG. 2 shows a design space 210 defined by two design variables $X_1$, $X_2$ (i.e., perturbed values for first control point 211, and perturbed values for second control point 212). Each of the sibling designs 214 (shown as hollow circles) is a result of a specific combination of design variables $\underline{X}$, for example, $\underline{X}=<X_1,X_2>$, for example, the perturbation shown in FIG. 1E is a sibling design based on a combination of the first perturbed value 121 for the first control point as $X_1$ and the first perturbed value 131 for the second control point as $X_2$.

In other words, each sibling design is created by perturbing one or more control point locations. Although there are only two design variables shown in FIG. 2, there can be more than two design variables according to this disclosure. The general form of a design variable is listed as follows: $\underline{X}=<X_1, X_2, \ldots, X_n>$, where n is a positive integer (e.g., 3, 4, 5 . . . ). A set of sibling designs 214 are created. Simulated physical characteristic for each sibling design 214 are obtained in a simulation (e.g., FEA). Physical characteristic is related to the design objective. For a design objective of minimizing displacement at a node of interest, the physical characteristic is the displacement at the node.

Figure 3:
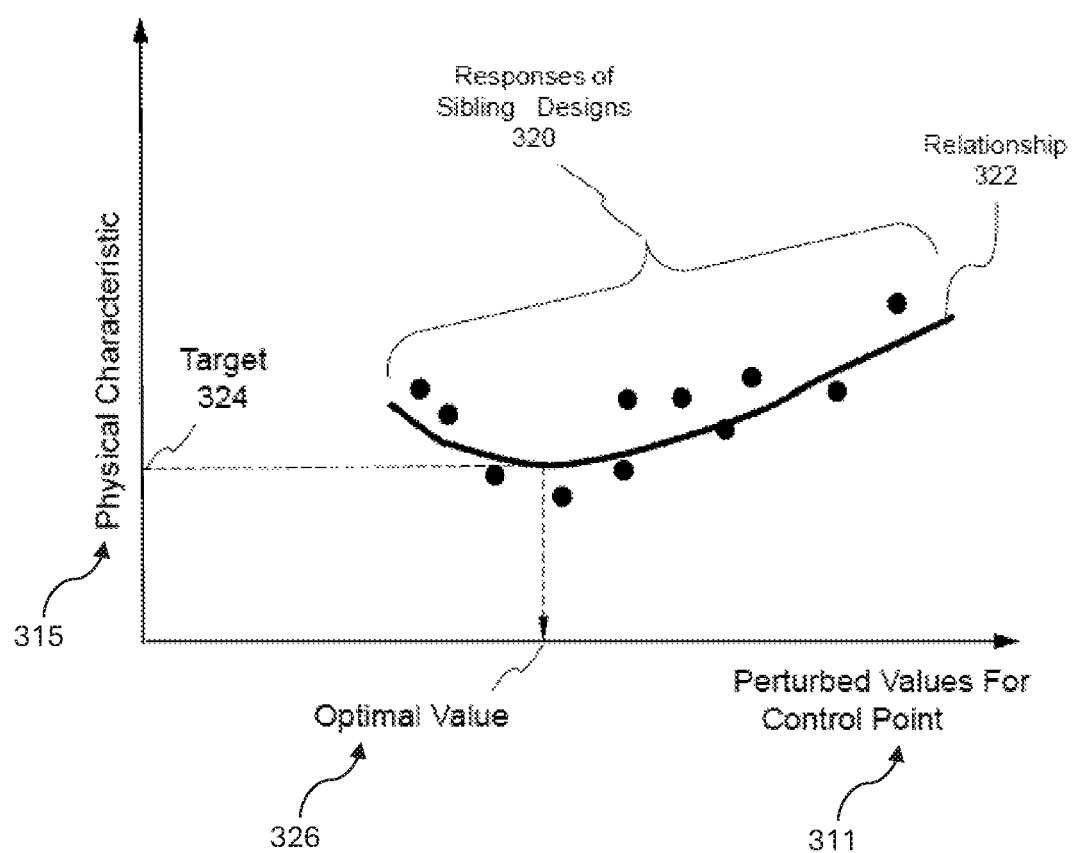
FIG. 3 is a diagram showing an example relationship (e.g., surrogate model) between a physical characteristic of a physical object and perturbed values for a control point.

FIG. 3 shows a plot 310 of a simulated physical characteristic 315 obtained in each sibling design in a respective simulation. The plot 310 has the vertical axis representing the physical characteristic 315 and the horizontal axis representing perturbed values for a control point 311. Simulated physical characteristic 315 can be a FEA result of the sibling designs 214 of FIG. 2. A surrogate model or relationship 322 is constructed or generated between the physical characteristic 315 and the perturbed values for a control point 311. In one embodiment, a least squares fitting technique is used for constructing the relationship 322 (also referred to as surrogate model, meta-model, response surface). In a shape optimization process, a design objective can be a target physical characteristic 324 of the physical object, for example, a particular minimum value for the physical characteristic 315. In the example shown in FIG. 3, an optimal value 326 for the control point can be determined according to a target physical characteristic 324 as the design objective from the relationship 322. In another embodiment, the relationship can be created via Taylor expansions. Using finite differences, the numerical derivative of the objective f to a single control point perturbation ξ is computed as df/dξ. From this construct, the Taylor expansion $$f(\xi) = f_0 + \xi \frac{df}{d\xi}$$

with $f_0$ the value at the base design and $\xi$ the perturbed value. For k control points the equation becomes $$f(\xi) = f_0 + \sum_{i=1}^{i=k} \xi_i \frac{df}{d\xi_i}.$$

Constraints are handled similarly. Optimization can now be done using these Taylor approximations to design objective and constraints.

The base FEA model can be updated to create an updated FEA model using the optimal value with substantially similar techniques for constructing a sibling FEA model. In other words, an updated FEA model can be created by adding nodal location changes (i.e., shape change) to the base FEA model. The updated FEA model is compared with the base FEA model to determine whether an optimal shape has reached in the shape optimization.

For illustration clarity, the example shown in FIG. 3 is for one control point. When multiple control points are used, the plot 310 becomes a multi-dimensional, which would be difficult to clearly show in a two-dimensional plot. The relationship 322 changes from a curve to a surface when there are two control points. For more than two control points, the relationship 322 becomes a hypersurface.

EXAMPLE

Figure 4A:
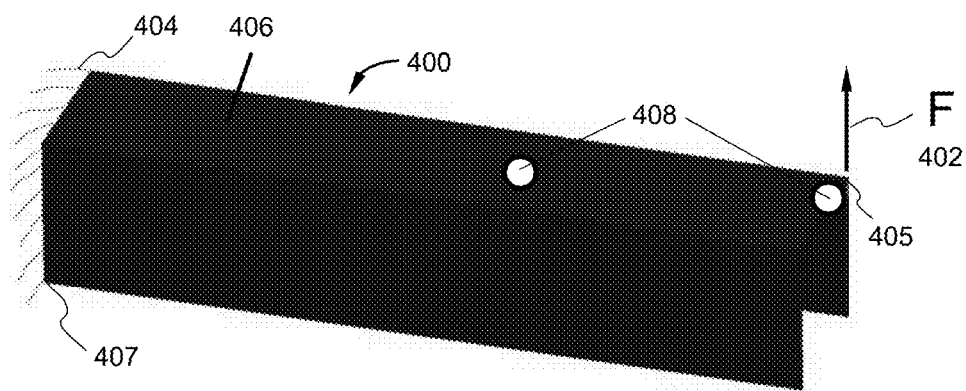
FIGS. 4A-4E are diagrams showing an example structure in a shape optimization.
Figure 4B:
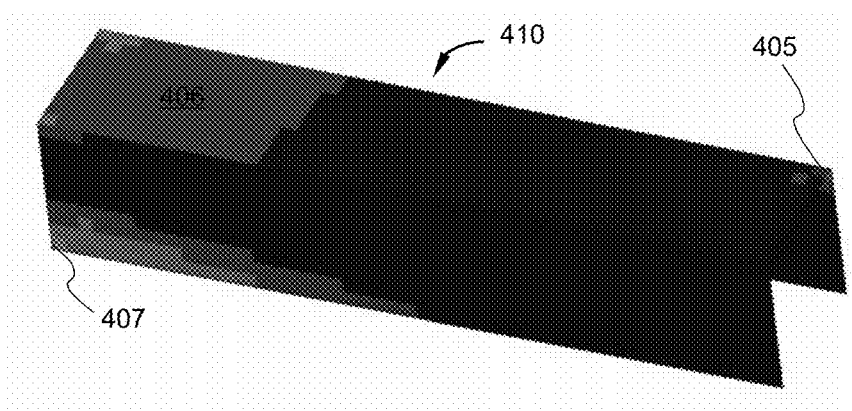
Figure 4C:
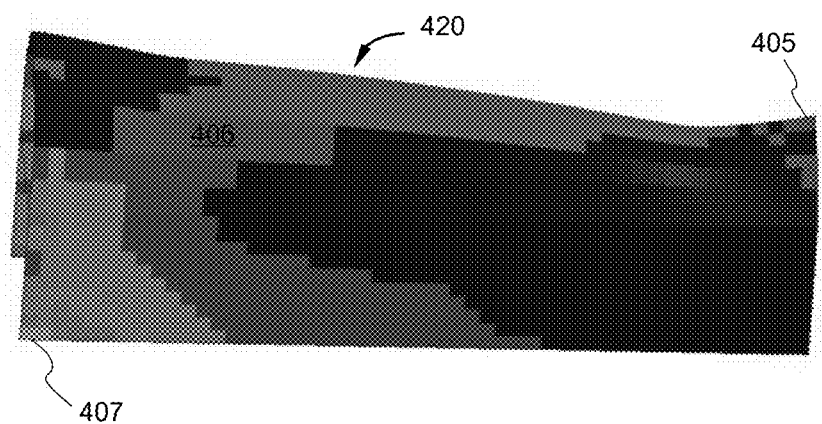

FIG. 4A shows a cantilever beam 400 with a point load F 402 at the upper corner 405 of the free edge and a fixed support 404. The shape of the top surface 406 is to be optimized with a design objective for minimizing the displacement at the upper corner 405 and a design constraint of limiting the stress to 1.15 at the bottom rear corner 407. For altering the shape, a physics informed basis function (e.g., internal energy density 410) is obtained as shown in FIG. 4B. The optimized shape 420 is shown in FIG. 9C. Two control points 408 (shown as while circular areas) are used for altering the shape of the surface 406.

Figure 4D:
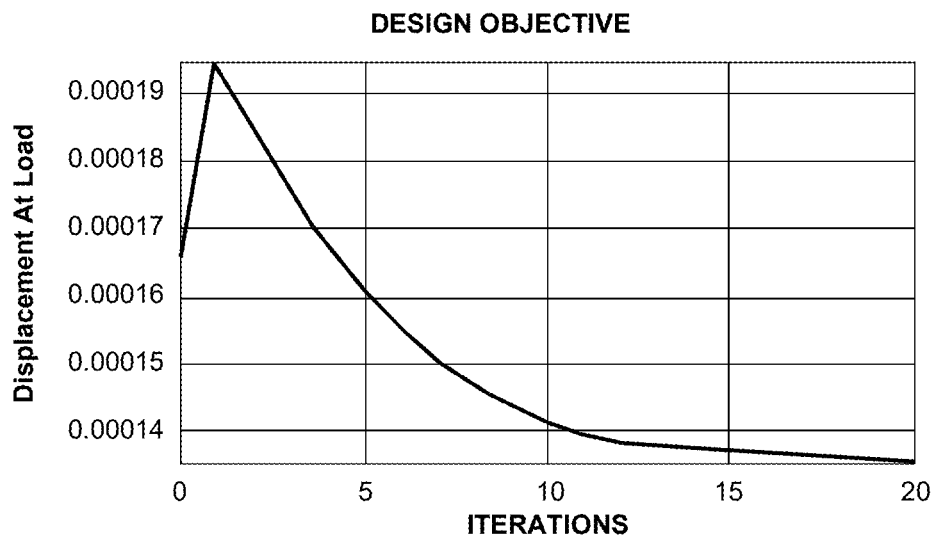
Figure 4E:
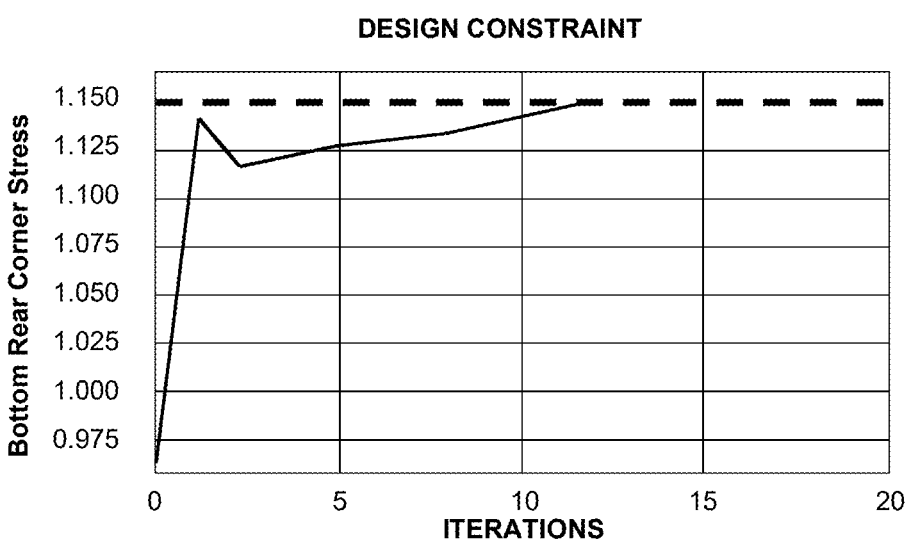

Twenty iterations in FIGS. 4D-4E show the progress of the shape optimization. The design objective shown in FIG. 4D is to minimize the displacement at the upper corner 405 where the point load F 402 acts. The displacement starts around 0.000165 in the beginning of the optimization. The displacement peaks at 0.00195 after one iteration of the optimization. Then the displacement drops to below 0.00014 after 10 iterations. A design constraint is also used in the shape optimization to limit the stress to 1.15 at bottom rear corner 407 shown in FIG. 4E.

Comparison

Figure 5A:
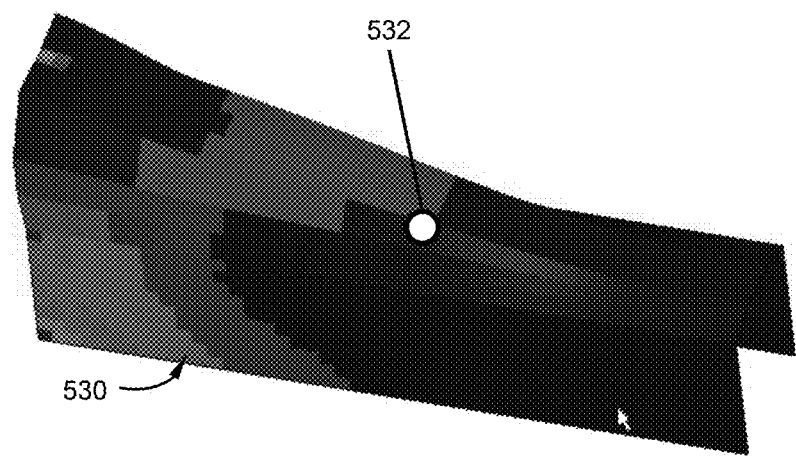
FIGS. 5A-5B are diagrams showing a shape optimization comparison.
Figure 5A:
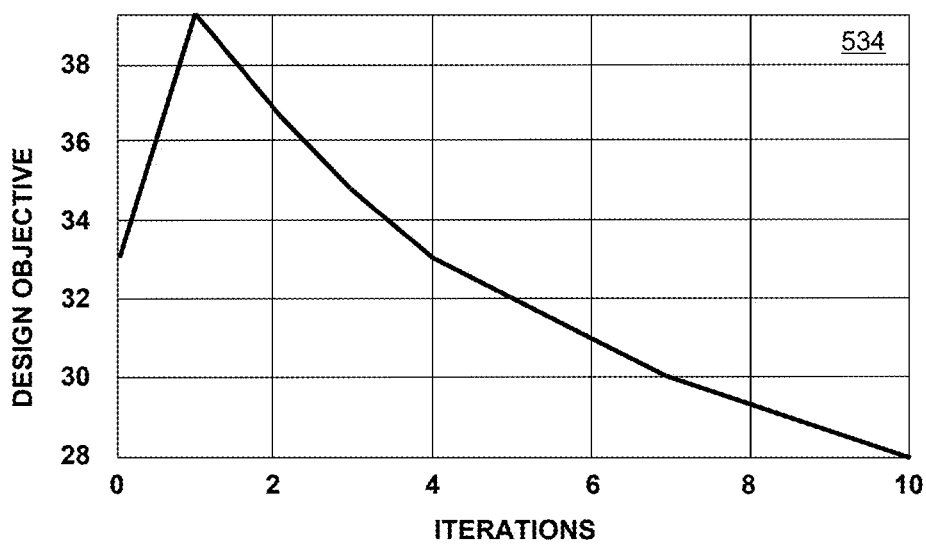

FIG. 5A shows an optimized shape 530 of a cantilever beam using one control point 532 (shown as a white circular area) according to the disclosed method. In plot 534 of 10 iterations of the optimization, the design objective (e.g., minimizing displacement) reaches 28. 21 FEA evaluations are required.

Figure 5B:
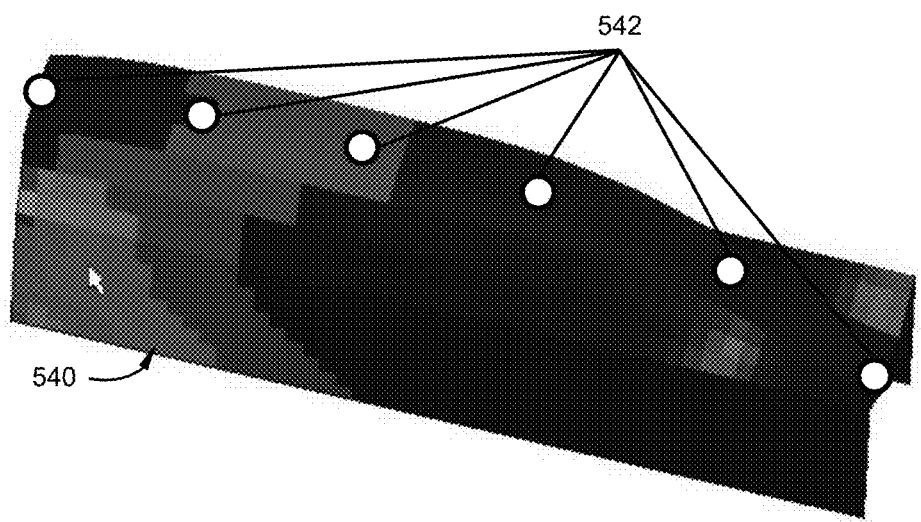
Figure 5B:
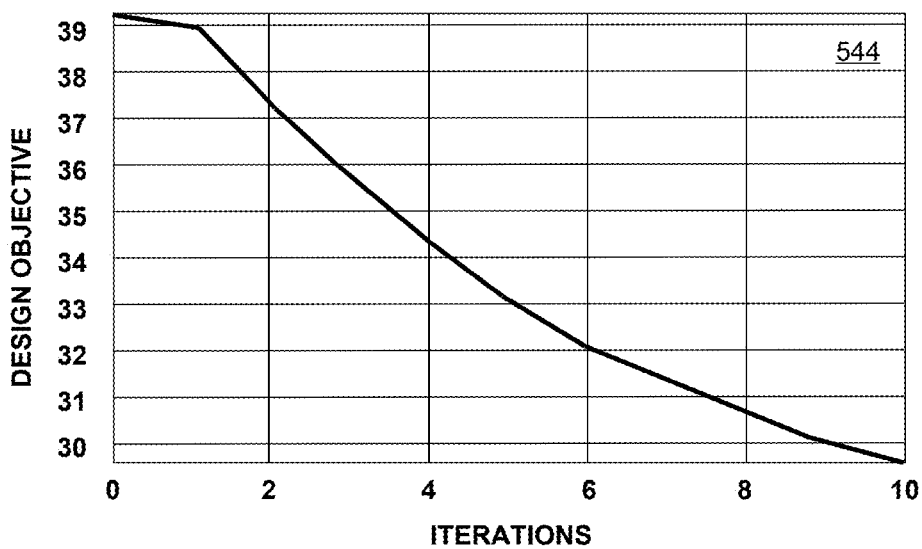

FIG. 5B shows an optimized shape 540 of the same cantilever beam in FIG. 5A using six control points 542 (circles) according to an approach in the prior art. In plot 544 of 10 iterations of the optimization, the design objective (e.g., minimizing displacement) reaches 29.5. 71 FEA evaluations are required.

Figure 6A:
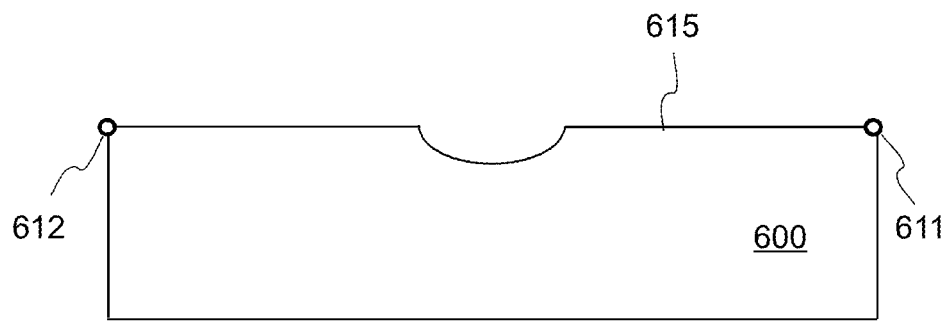
FIGS. 6A-6E are diagrams showing a shape optimization for an example physical object using a physics informed basis function of a base design for the physical object.

FIG. 6A is a diagram depicting an example base design 600 for a physical object (e.g., structure, part, product). In a shape optimization, shape of a surface 615 in the base design 600 can be optimized according to a design objective that relates to a physical characteristic (e.g., displacement, weight, fatigue life, crack propagation, etc.). For illustration simplicity, the example shown in FIG. 6A is a two-dimensional physical object 600. It can also be the uniform two-dimensional cross-section of a three-dimensional physical object 600. There are two control points 611-612 for altering the shape of the surface 615. The base design 600 is analyzed in a simulation (e.g., an FEA) to obtain simulated physical behaviors or structural responses, for example, displacement, stress, internal energy density, etc.

Figure 6B:
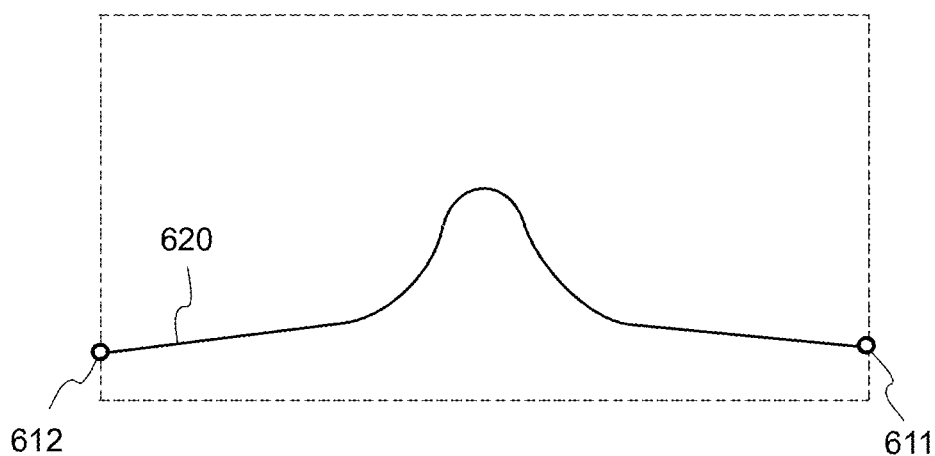

A physics informed basis function 620 shown in FIG. 6B is determined based on one or more simulated physical behaviors. The physics informed basis function 620 contains a bump (e.g., higher internal energy density values) due to stress concentration around the notch.

Figure 6C:
Figure 6D:
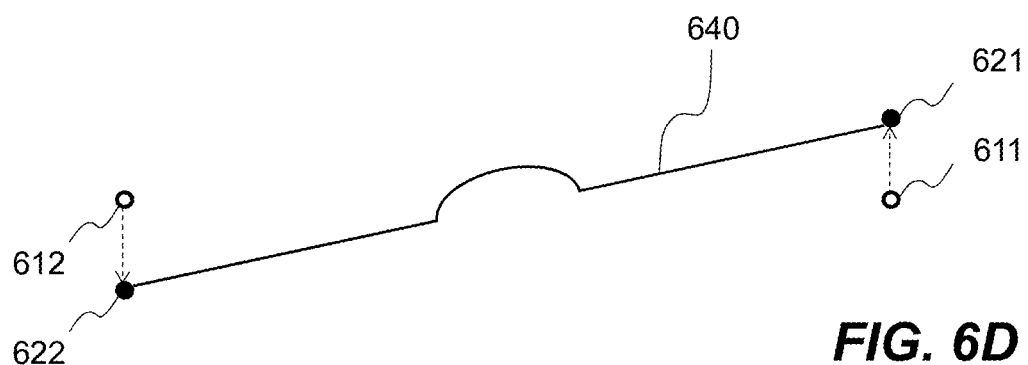
Figure 6E:
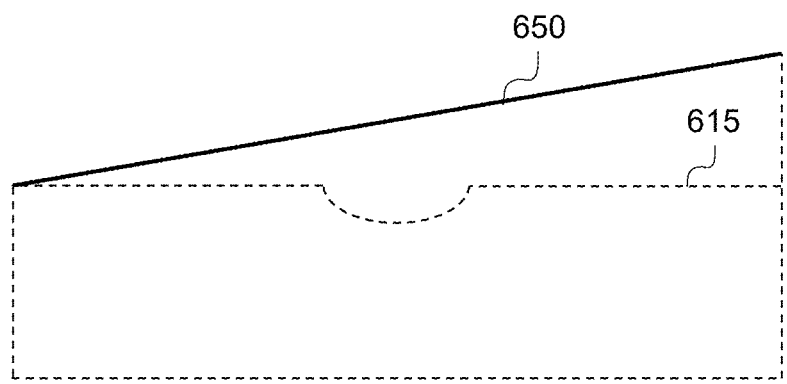

A set of sibling designs are created with a perturbation scheme. The perturbation scheme perturbs a respective control point with one or more perturbed values. Then a respective simulation is conducted for each sibling design to obtain simulated physical characteristic (e.g., displacement at a node of interest). A relationship (e.g., a surrogate model) is generated between the simulated physical characteristic of the sibling designs and perturbed values. Corresponding optimal values for the control points for an updated design can be determined from the generated relationship according to the design objective. FIG. 6C shows such optimal values 621 and 622 for the control points 611 and 612. FIG. 6D is a diagram showing a shape change 640 calculated using Formula (1) based on the optimal values 621 and 622 for the control points 611 and 612 and the physics informed basis function 620. FIG. 6E shows the shape 650 of the updated design becomes a straight line without a notch.

Verification Examples

Figure 7A:
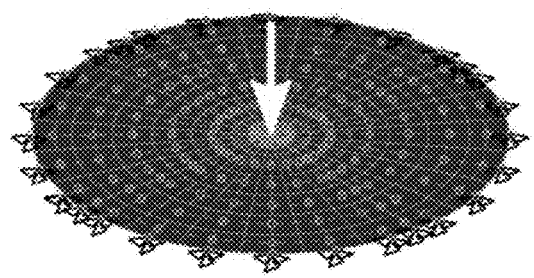
FIG. 7A shows a simply supported disk in a shape optimization.
Figure 7A:
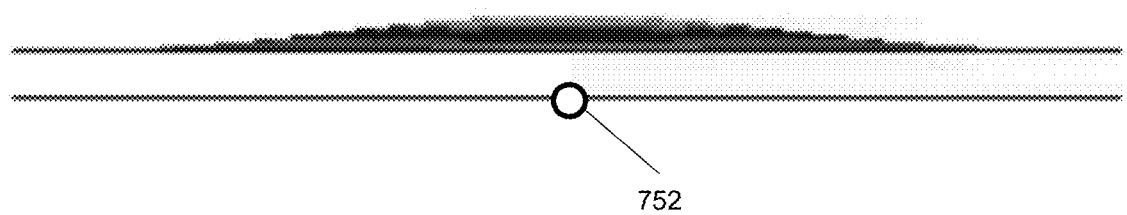

FIG. 7A shows a simply supported disk subject to a point load at center as a first example. The design objective is to minimize the energy. A single control point 752 is used for verification. In 10 iterations, the objective has dropped from 0.00714 to 0.00028 (3.8% of the original).

Figure 7B:
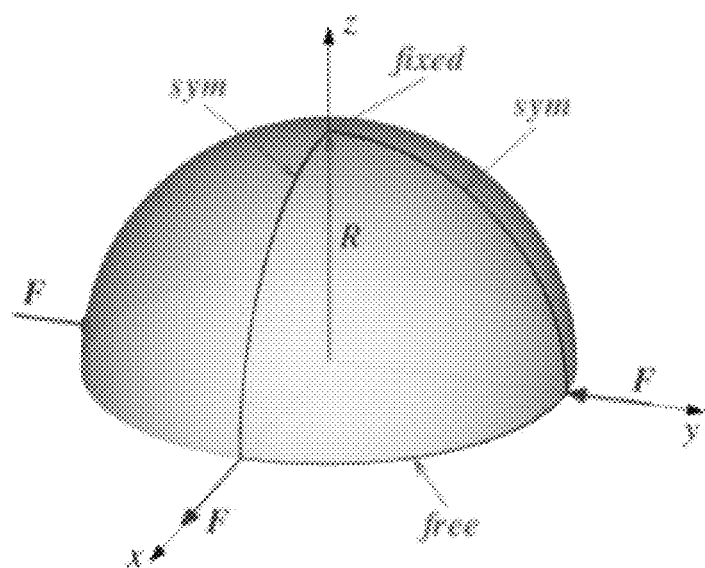
FIGS. 7B-7C collectively shows a pinched hemisphere in a shape optimization.
Figure 7C:
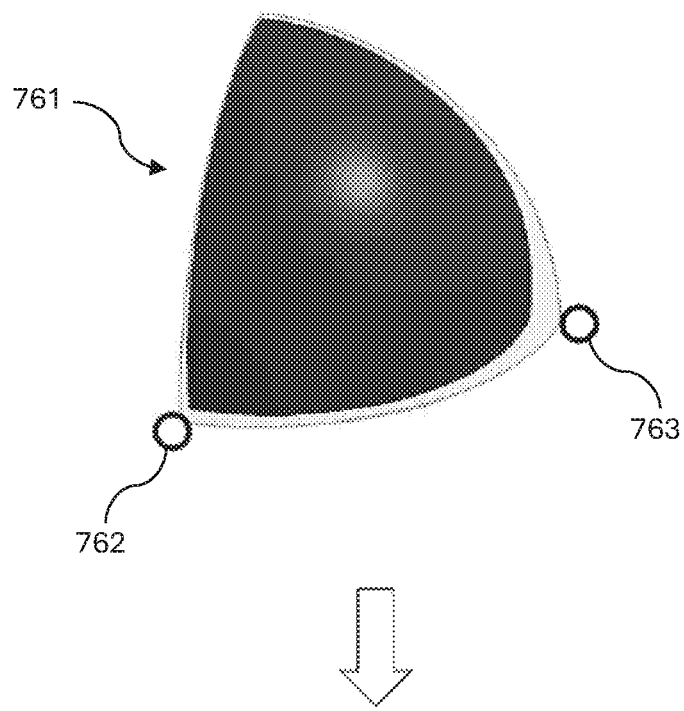
Figure 7C:
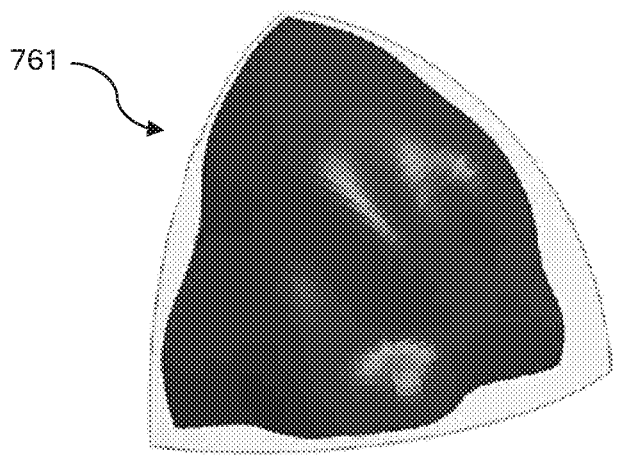

FIGS. 7B-7C collectively shows a pinched hemisphere according to an objective of minimizing the energy as a second example.

A quarter model of the hemisphere is used for saving computer simulation time. Two control points 762-763 are used for the verification. Internal energy density is used as physics informed basis function. The first optimization run reduces the objective from 0.0924 to 0.075. Continuing the optimization reduces the objective further to 0.006.

Figure 7D:
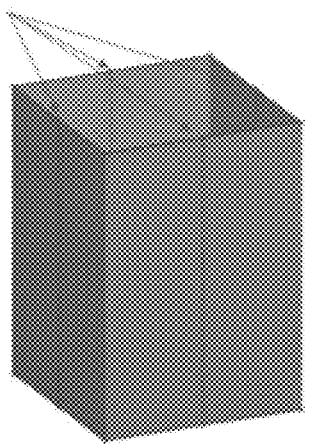
FIG. 7D shows a tube under internal pressure in a shape optimization.
Figure 7D:
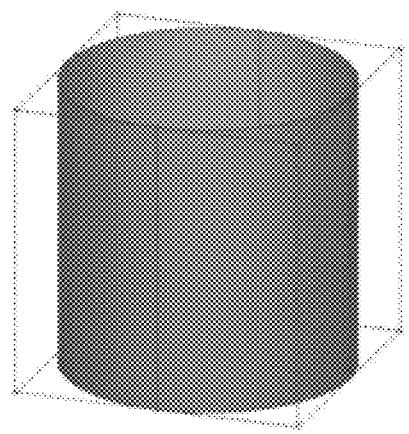
Figure 7D:
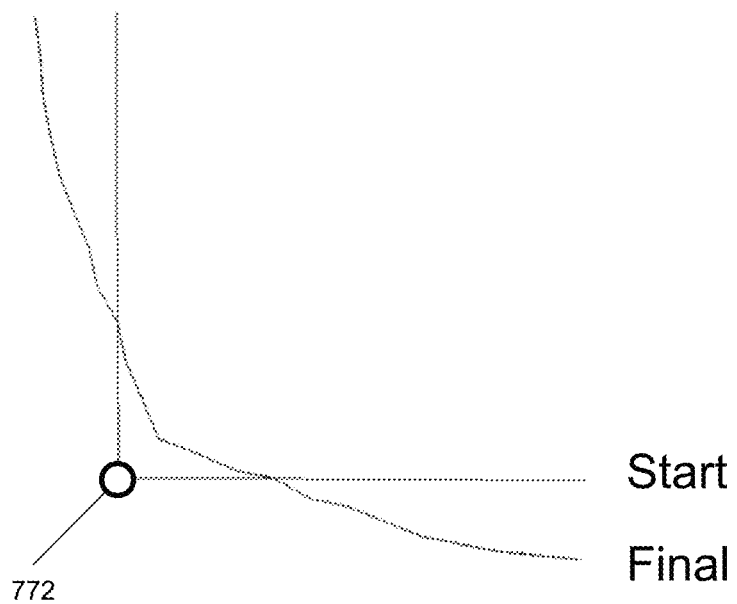

FIG. 7D shows a tube under internal pressure as a third example. The tube starts with a square cross-section. The optimal shape should have a circular cross-section. A quarter model is used for saving simulation time. One control point 772 is used. The objective drops from 0.0000011 to 0.000000044.

Figure 8A:
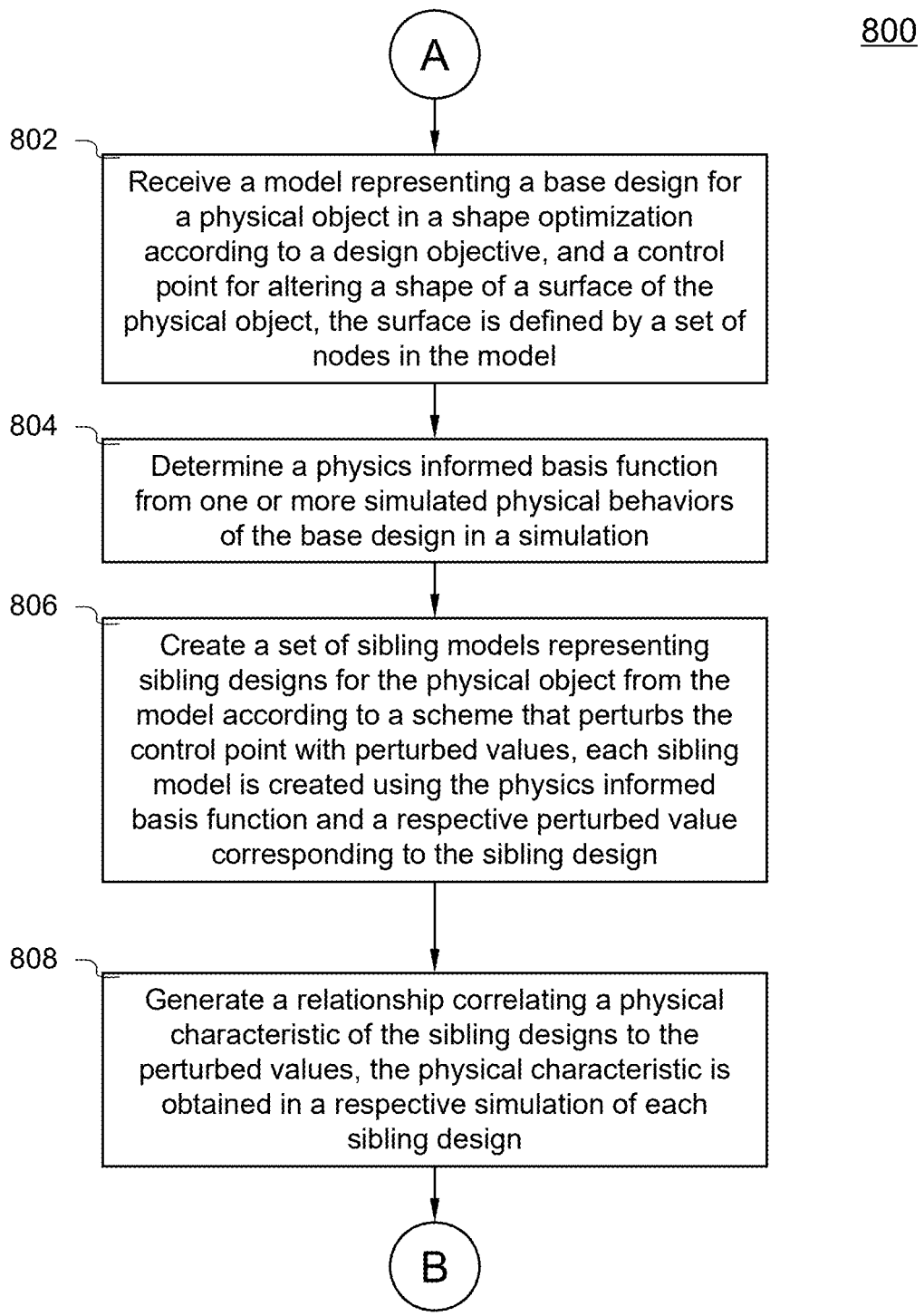
FIGS. 8A-8B collectively is a flow diagram illustrating a first example process of performing a shape optimization for a physical object.
Figure 8B:
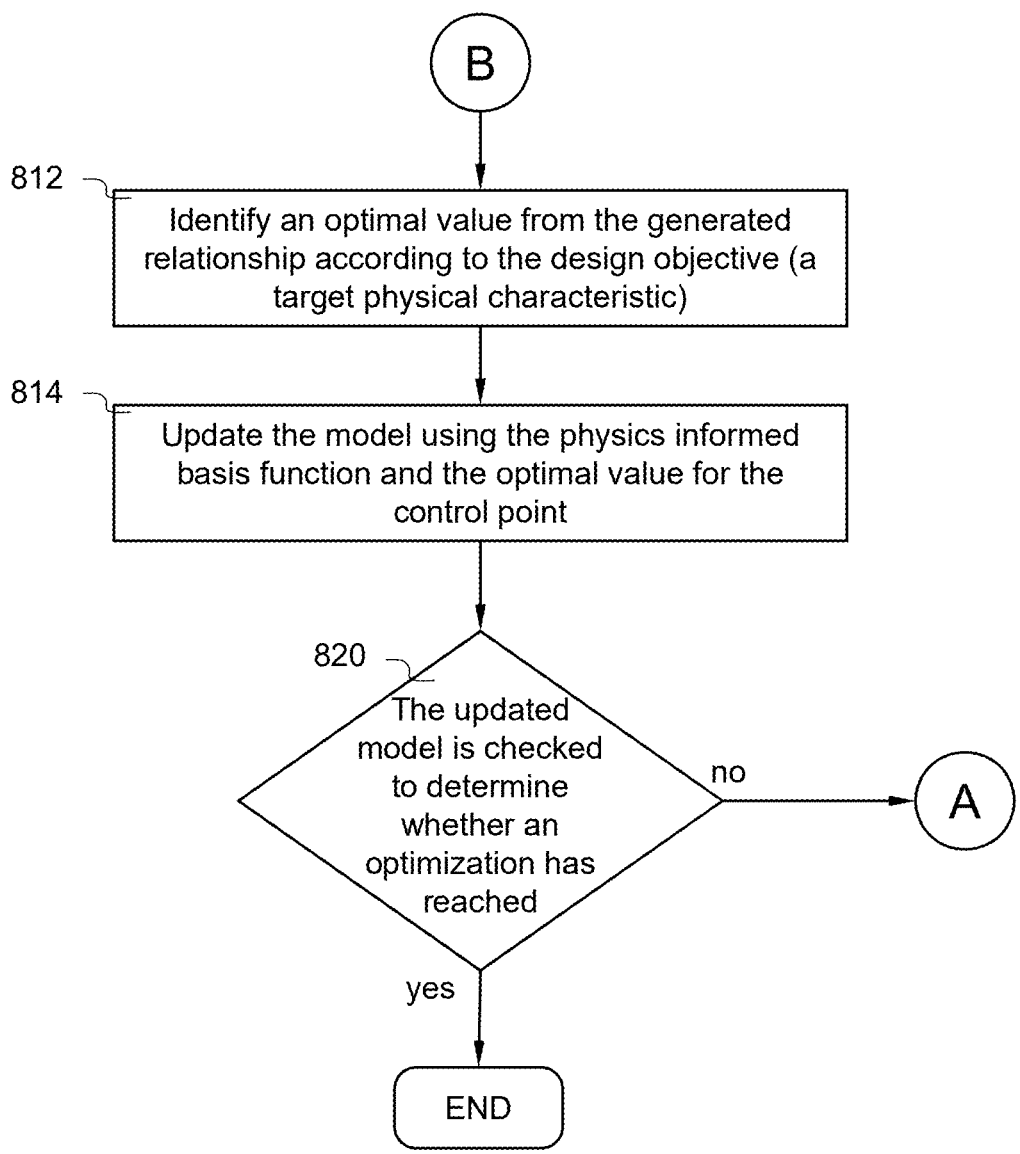

FIGS. 8A-8B collectively depict a first example process 800 of performing a shape optimization for a physical object (e.g., structure, product, part, etc.) using a physics informed basis function determined based on one or more simulated physical behaviors of a base design for the physical object.

Figure 9A:
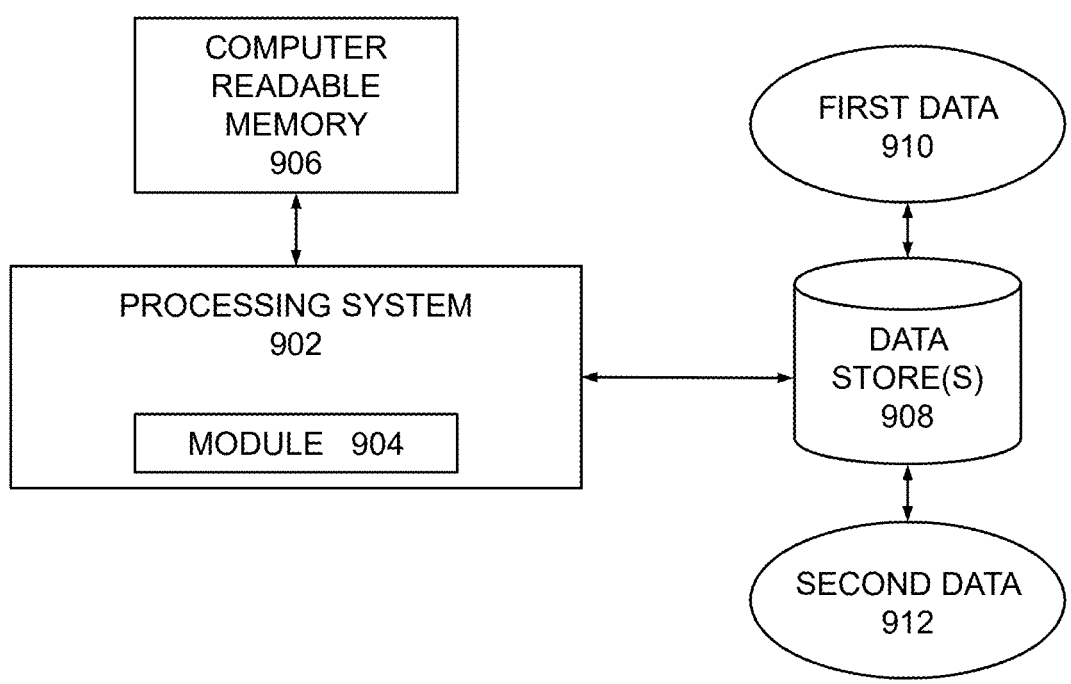
FIG. 9A is a block diagram showing an example system including a standalone computing architecture.
Figure 9B:
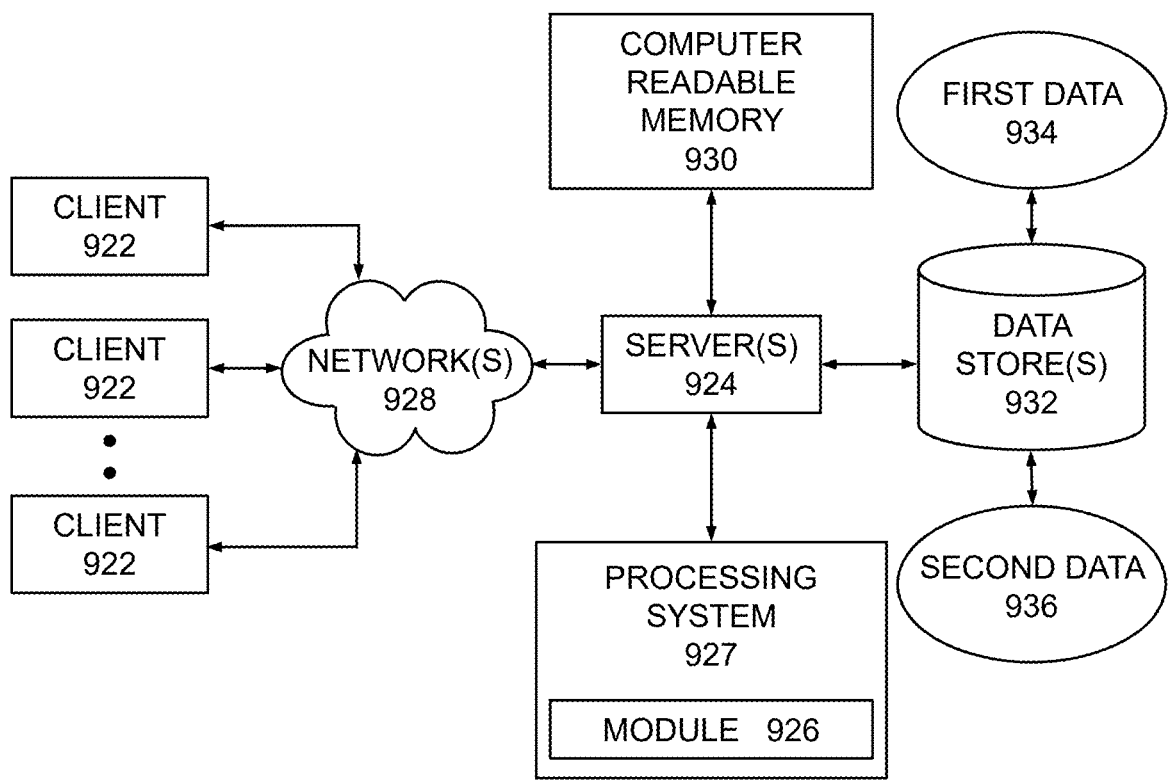
FIG. 9B is a block diagram showing an example system including a client-server computing architecture.
Figure 9C:
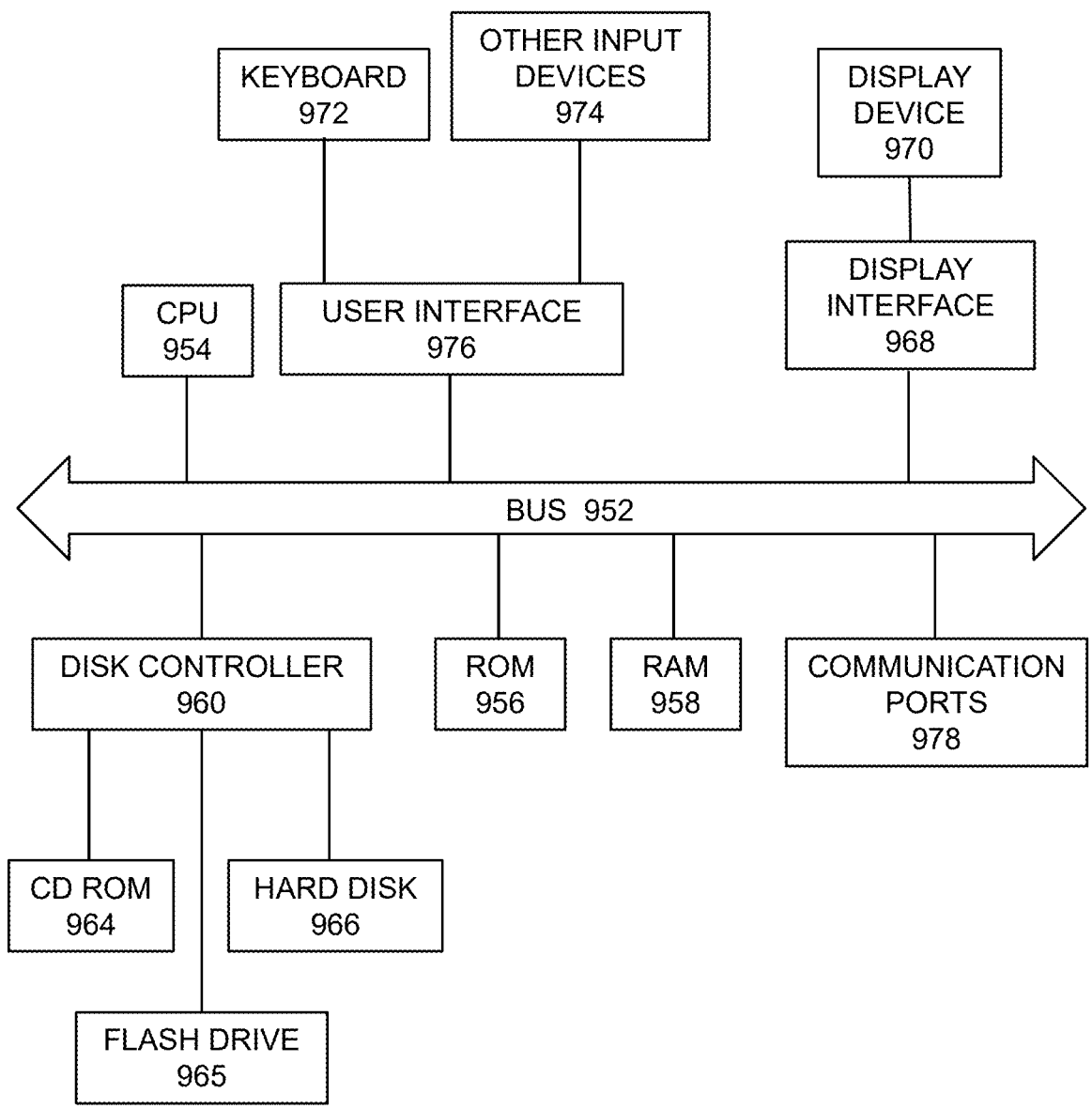
FIG. 9C is a function block diagram depicting salient components of an example computing device for implementing the subject matters described herein.

Process 800 starts at action 802 by receiving a model (e.g., FEA model) representing a base design for a physical object in a shape optimization according to a design objective in computer system (e.g., computer systems 900, 920 in FIGS. 9A-9B). Also received is a control point for altering a shape of a surface of the physical object. The control point can be defined as one of a set of nodes that define the surface in the model. There can be more than one control points for altering the shape.

At action 804, a physics informed basis function is determined from one or more simulated physical behaviors or structural responses of the base design under an environmental condition (e.g., external loadings) in a simulation (e.g., an FEA) using the received model. The simulated physical behaviors can include, but are not limited to, internal energy densities, principal stresses, displacements, or other applicable physical behaviors of the base design. Since the physics informed basis function is obtained specifically for the base design, the physics informed basis function can better approximate a shape change in the physical object than any other generic basis functions.

Next, at action 806, a set sibling models representing sibling designs for the physical object are created from the model representing the base design according to a perturbation scheme (e.g., design of experiments, finite difference) . The perturbation scheme perturbs the control point to various perturbed values from the original location to corresponding perturbed locations. Each sibling design corresponds to a respective perturbed value. Each sibling model is created by adding a shape change (nodal location changes) to the nodal locations in the model representing the base design. The shape change can be calculated using Formula (1), which includes basic shape change modified with the physical informed basis function normalized by a scale function.

Then, at action 808, a relationship (e.g., a surrogate model) is generated or constructed to correlate a physical characteristic of the sibling designs for the physical object to the perturbed values for the control point. The physical characteristic is obtained in respective simulation of each sibling design.

At action 812, an optimal value is identified from the generated relationship according to the design objective (e.g., a target physical characteristic). At action 814, the model is updated using the physics informed basis function and the optimal value for the control point, for example, via Formula (1) substantially similar to creating each sibling model. Instead of using the perturbed value, the optimal value is used.

Since the generated relationship is an approximation, the updated model may not contain an optimized shape at a given iteration in the shape optimization. At decision 820, the updated model is checked to determine whether an optimization has reached. If false, process 800 follows the 'no' branch back to action 802 for another iteration in the shape optimization by repeating the above-described actions until decision 820 becomes true. There are many known techniques to determine whether an optimized shape has achieved. For example, one of the techniques used in decision 820 is to compare the updated model to the received model to find out whether the difference is within a predefined tolerance.

Figure 8C:
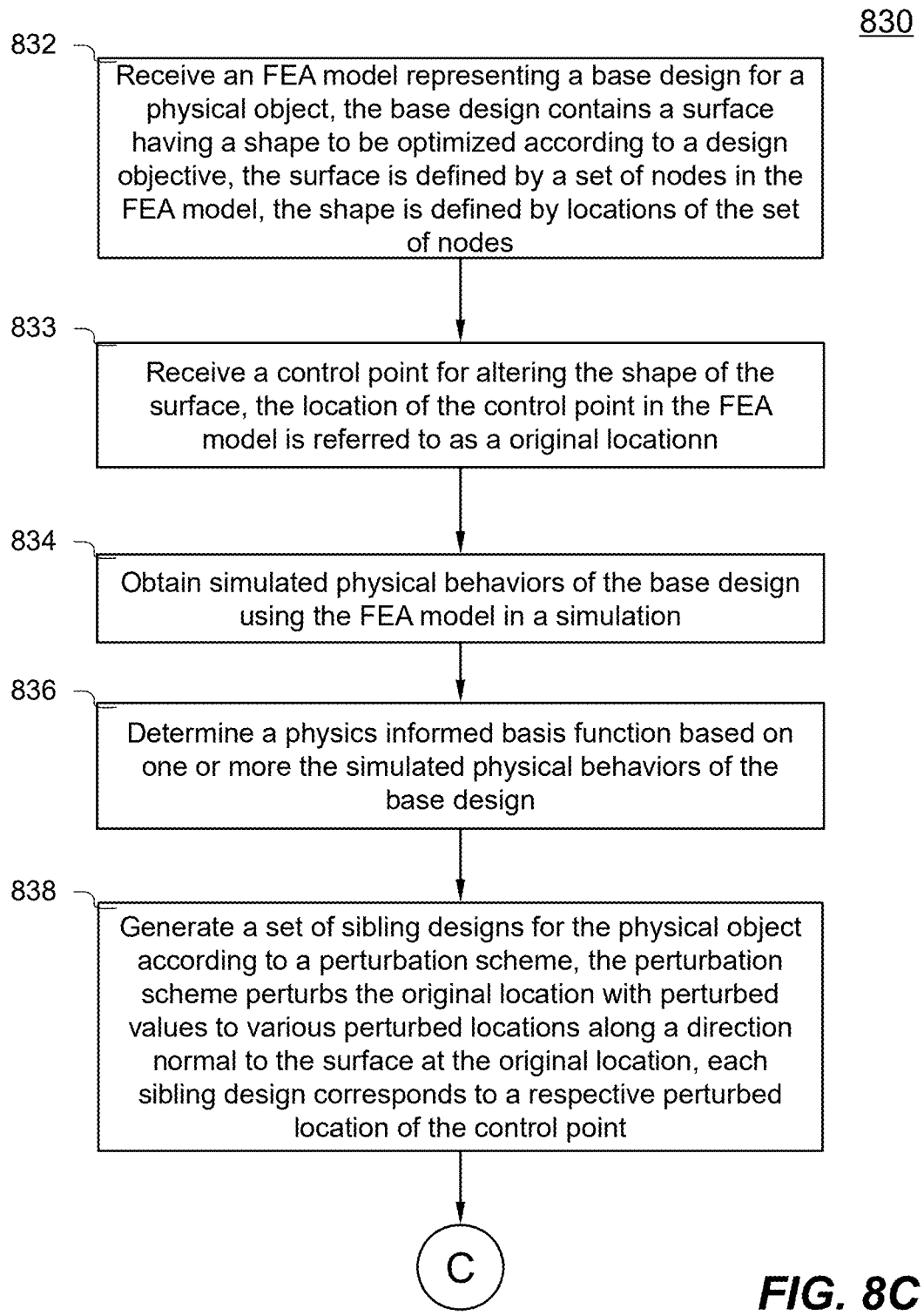
FIGS. 8C-8E collectively is a flow diagram illustrating a second example process of performing a shape optimization for a physical object.
Figure 8D:
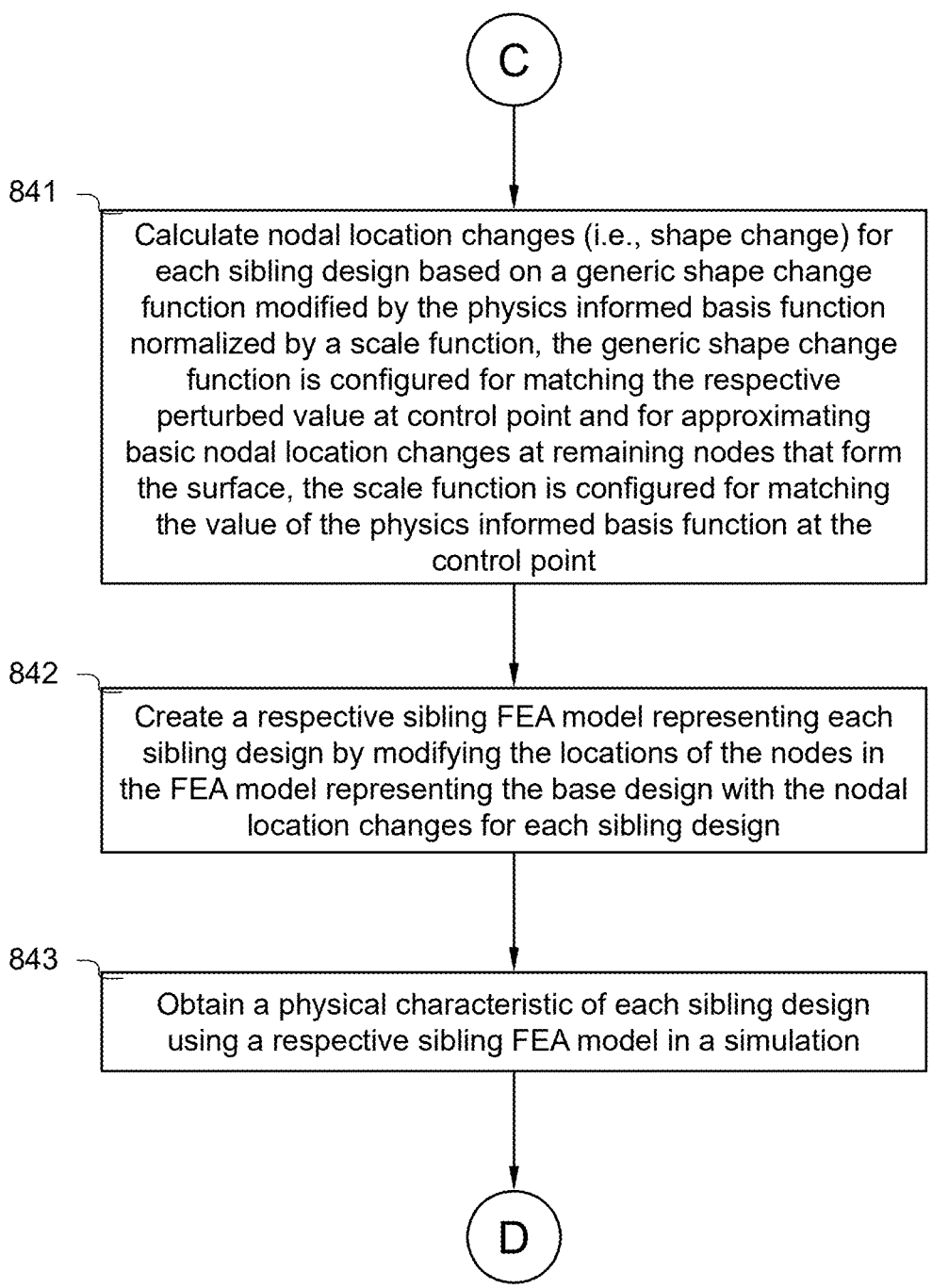
Figure 8E:
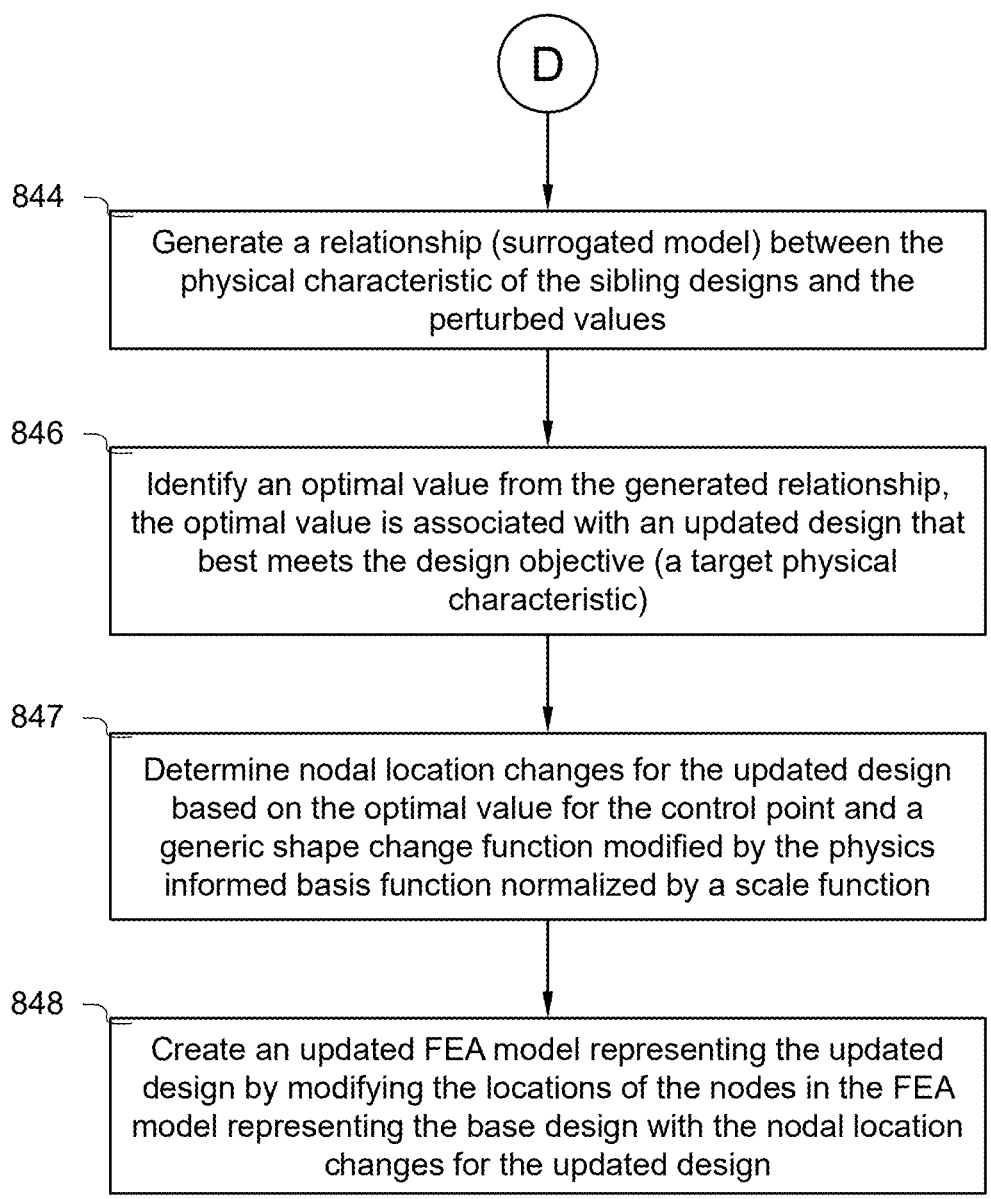

A second example process 830 of performing a shape optimization for a physical object (e.g., structure, product, part, etc.) is collectively shown in FIGS. 8C-8E. Process 830 starts by receiving a FEA model representing a base design for a physical object (e.g., structure, product, part, component) in a computer system (e.g., computer systems 900, 920 in FIGS. 9A-9B) at action 832. The base design contains a surface (e.g., outer surface) having a shape to be optimized according to a design objective. The surface is defined by a set of nodes in the FEA model. As a result, the shape is defined by locations of the set of nodes.

At action 833, a control point is received for altering or changing the shape of the surface. The control point can be one of the nodes that define the surface. The location of the control point in the FEA model is referred to as an original location.

Then, at action 834, a simulation is conducted using the FEA model to obtain simulated physical behaviors (e.g., structural behaviors) of the base design for the physical object. Example physical behaviors include, but are not limited to, displacements, internal energy densities, principal stresses. At action 836, a physics informed basis function is determined based on one or more simulated physical behaviors of the base design.

The physics informed basis function is configured for calculating a shape change of a surface in a design (e.g., sibling design, updated design) for the physical object. Since each sibling design is represented by a respective sibling FEA model and the surface is defined by a set of nodes, the shape change can be represented by a set of nodal location changes to the locations of the nodes in the FEA model. Because the physics informed basis function possesses a physical correlation specifically for the physical object, a shape change (i.e., nodal location changes) derived therefrom can be more realistic than that from a generic approximation function. As a result, a shape optimization can be conducted more efficiently when using physics informed basis function.

To conduct a shape optimization, a set of sibling designs for the physical objects are generated according to a perturbation scheme at action 838. Perturbation scheme perturbs the original location of the control point to a respective perturbed location for each sibling design. The respective perturbed location corresponds to a perturbed value, which is the distance between the original location and the respective perturbed location. Each perturbed location is located along a direction normal to the surface at the original location of the control point.

Next, at action 841, a set of nodal location changes (i.e., shape change) for each sibling design are calculated based on Formula (1), which includes a generic shape change function modified by the physics informed basis function normalized by a scale function. At action 842, a respective sibling FEA model is created for each sibling design by modifying the locations of the nodes in the FEA model representing the base design with the set of nodal location changes for each sibling design.

At action 843, a physical characteristic of the physical object is obtained for each sibling design using a respective sibling FEA model in simulation. Then, at action 844, a relationship (e.g., a surrogate model) is generated between the physical characteristic of the sibling designs and the perturbed values. The physical characteristic of the physical object is related to the design objective, for example, displacement, fatigue life, crack propagation, a weighting of structural and fluid results.

Next, from the generated relationship, an optimal value associated with an updated design that best meets the design objective (a target physical characteristic) is identified at action 846. At action 847, nodal location changes (i.e., shape change) for the updated design are determined based on Formula (1), which includes a generic shape change function modified by the physics informed basis function normalized by a scale function. The generic shape change function is configured for matching the optimal value at the control point and for approximating basic nodal location changes at nodes that form the surface. The scale function is configured for matching the value of the physics informed basis function at the control point.

An updated FEA model representing the updated design is created at action 848 by updating the locations of the nodes in the FEA model representing the base design with the set of nodal location changes for the updated design. If the updated design is optimal in comparison with the base design according to predefined optimization criteria, the updated design is an optimal design. Otherwise, the shape optimization continues by repeating process 830 by using the updated design as a new base design.

Figure 8G:
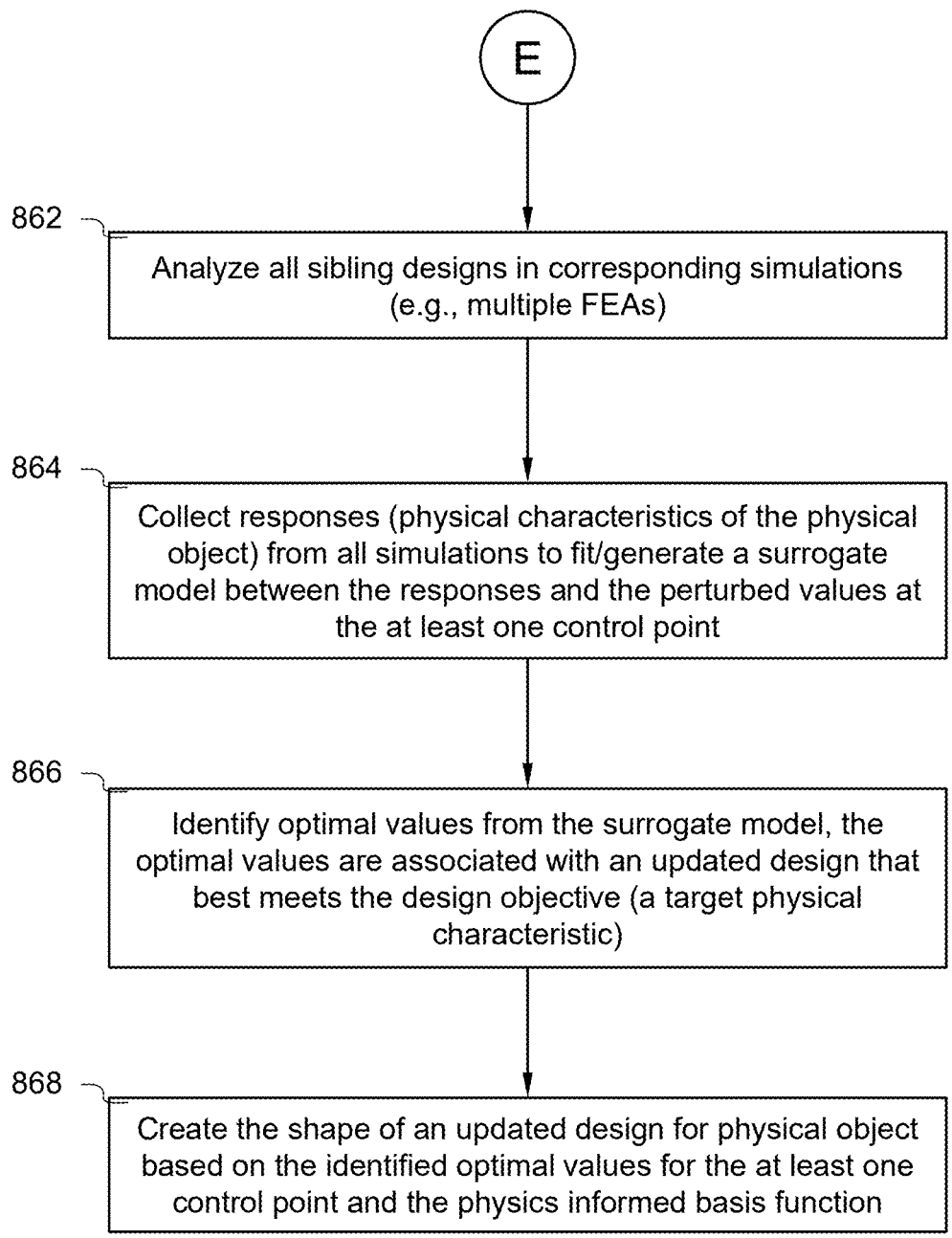

FIGS. 8F-8G collectively depict a third example process 850 of performing a shape optimization for a physical object (e.g., structure, product, part, component, etc.). Process 850 starts by receiving a design (e.g., FEA model) for a physical object in a computer system (e.g., computer systems 900, 920 in FIGS. 9A-9B) at action 852. Also received is at least one control point for altering a shape in the design. The shape is to be optimized according to a design objective (e.g., a target physical characteristics of the physical object). At action 854, the base design is analyzed in a simulation (e.g., an FEA). An interpolating function (i.e., physics informed basis function) is determined from one or more simulated results of the base design at action 856. Next, at action 858, a set of sibling designs are created by perturbing a respective location of each control point with perturbed values according to a perturbation scheme. The physics informed basis function is used for creating a shape change of a respective sibling design between the at least one control point based on Formula (1). All sibling designs are analyzed in corresponding simulations (e.g., multiple FEAs) at action 862. Next, at action 864, responses (simulated physical characteristics of the physical object) from all simulations of the sibling designs are collected to fit/generate a surrogate model that correlates the simulated responses (i.e., the physical characteristic) of the sibling designs to the perturbed values of the at least one control point. At action 866, optimal values of the at least one control point are identified from the surrogate model. The optimal values are associated with an updated design (e.g., a redesigned structure from the base design) that best meets the design objective (i.e., a target physical characteristic). At action 868, the shape of the updated design is determined/created based on the identified optimal values at the at least control point and the physics informed basis function via Formula (1). When the shape of the updated design needs further improvement, Process 850 can be repeated for another iteration of the shape optimization.

Process 850 is summarized in the following steps:
A. Conducting analysis of a base design corresponding to a shape received in a computer system.
  i. Computing interpolating function (i.e., physics informed basis function) from the base design
B. Creating sibling designs by
  i. perturbing the design surface/structure at one or more control points.
  ii. interpolating the design surface/structure between the control point using interpolating function (i.e., physics inform function).
C. Analyzing the sibling designs from step B.
D. Creating a surrogate model to the design objective using perturbations (e.g., perturbed values) at the control points as design variables.
E. Redesigning the shape of the base design using the surrogate model.

Repeating B.-E. as many times as necessary to reach an optimal shape (based on criteria).

Figure 8H:
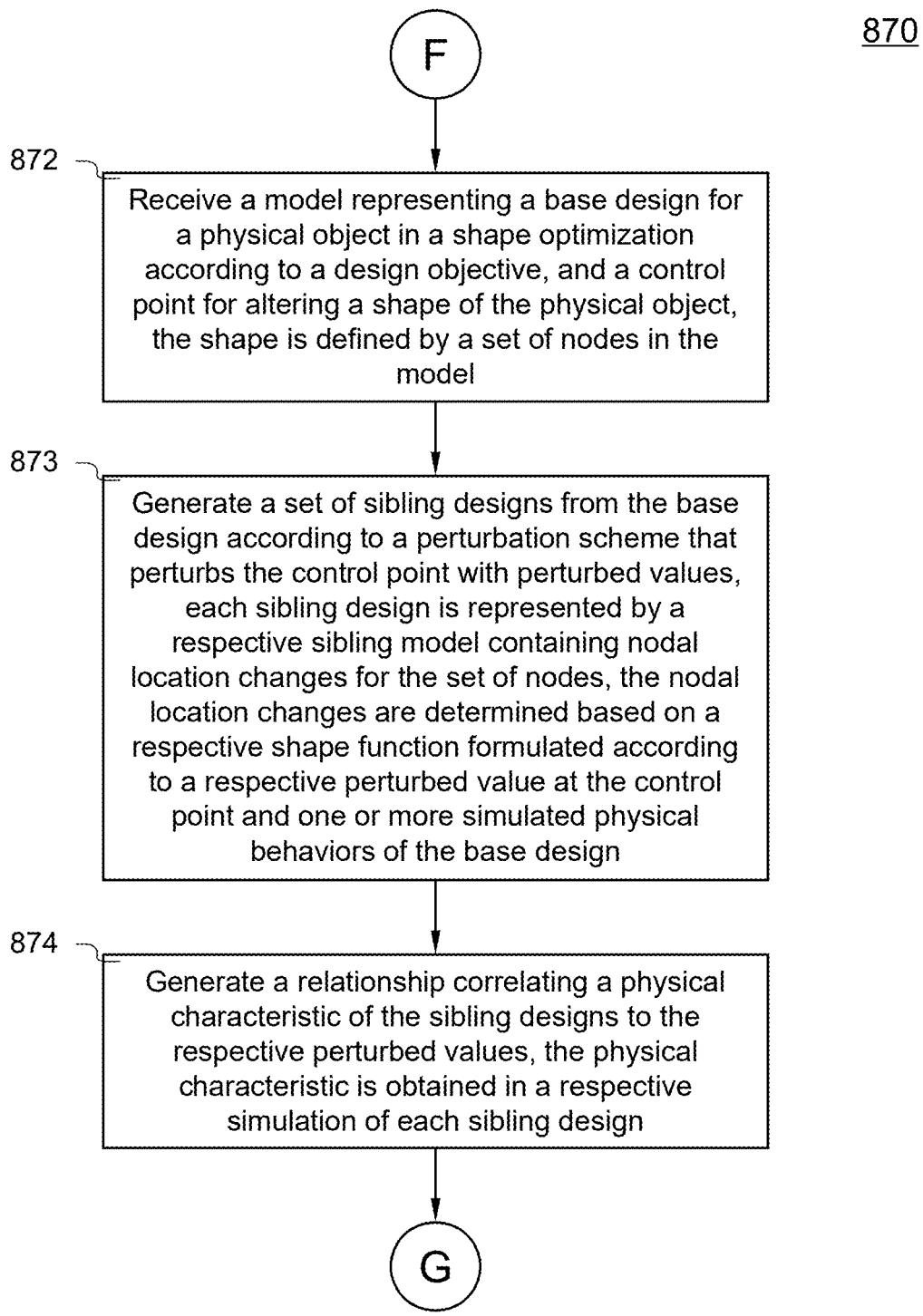
FIGS. 8H-8I collectively is a flow diagram illustrating a fourth example process of performing a shape optimization for a physical object.
Figure 8I:
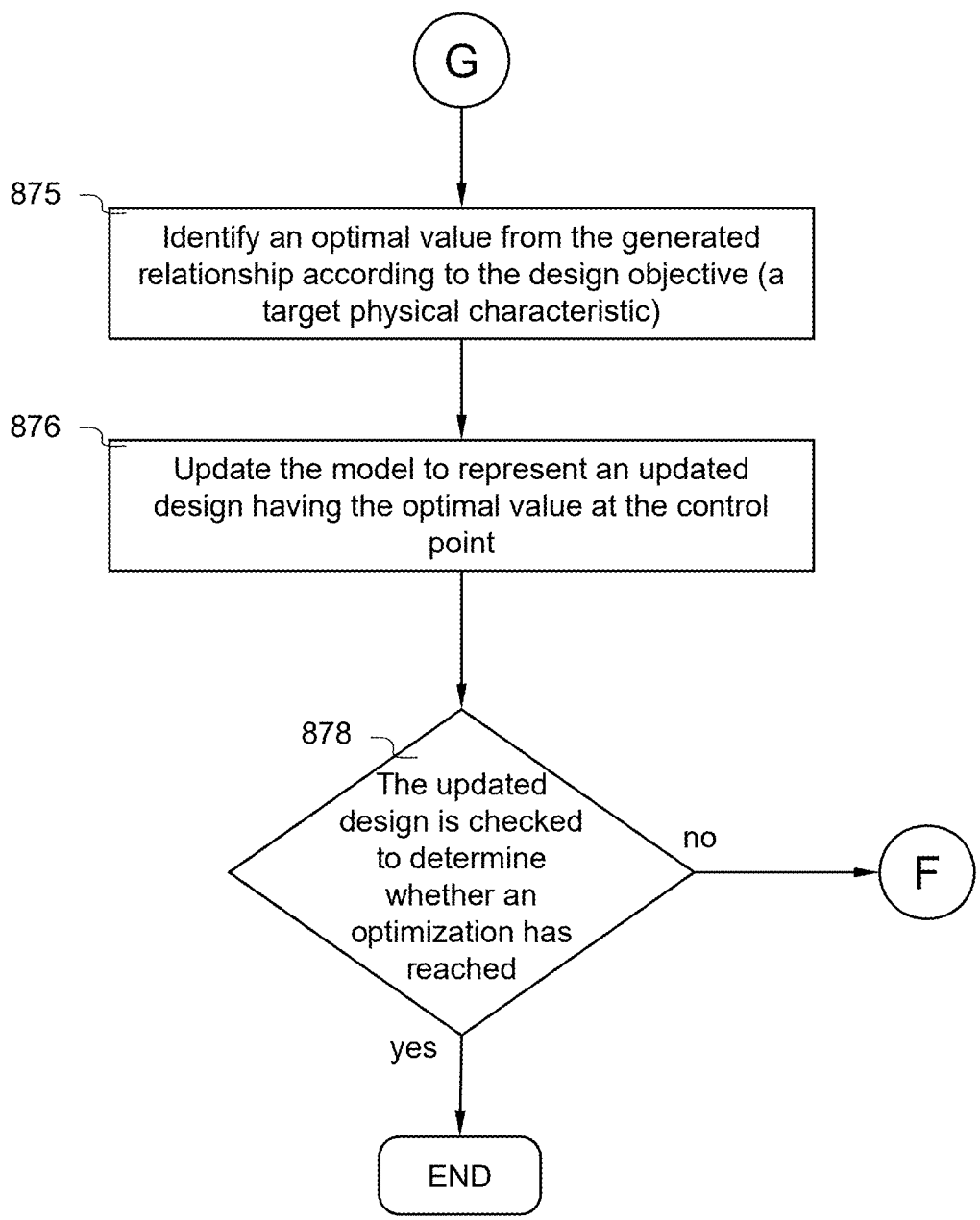

FIGS. 8H-8I shows a fourth example process 870 of performing a shape optimization for a physical object. Process 870 starts at action 872 by receiving a model (e.g., FEA model) representing a base design for a physical object in a shape optimization according to a design objective in computer system (e.g., computer systems 900, 920 in FIGS. 9A-9B). Also received is a control point for altering a shape of the physical object. The shape is defined a set of nodes in the model. There can be more than one control points.

At action 873, a set of sibling designs are generated from the base design according to a perturbation scheme that perturbs the control point with perturbed values. Each sibling design is represented by a respective sibling model, which contains a set of nodal location changes (i.e., a shape change) for the set of nodes in the model. The nodal location changes are determined based on a respective shape function associated with the control point. The respective shape function is formulated according to a respective perturbed value at the control point and one or more simulated physical behaviors of the base design. One example is to use Formula (1) to calculate nodal location changes for each sibling model.

Then, at action 874, a relationship (e.g., a surrogate model) is generated to correlate a physical characteristic of the sibling designs for the physical object to the respective perturbed values for the control point. The physical characteristic is obtained in respective simulation of each sibling design.

At action 875, an optimal value is identified from the generated relationship according to the design objective (e.g., a target physical characteristic). At action 876, the model is updated to represent an updated design having the optimal value for the control point. This can be done, for example, via Formula (1) substantially similar to creating each sibling model. Instead of using the respective perturbed value, the optimal value is used.

At decision 878, the updated design is checked to determine whether an optimization has reached. If false, process 870 follows the 'no' branch back to action 872 for another iteration in the shape optimization by repeating the above-described actions 872-876 until decision 878 becomes true. There are many known techniques to determine whether an optimized shape has achieved. For example, one of the techniques used in decision 878 is to compare the updated design to the base design to find out whether the difference is within a predefined tolerance.

The subject matter described herein may be implemented using any suitable processing system with any suitable combination of hardware, software and/or firmware, such as described below with reference to the non-limiting examples shown in FIGS. 9A-9D.

FIG. 9A depicts an example system 900 that includes a standalone computer architecture where a processing system 902 (e.g., one or more computer processors) includes a module 904 (e.g., software module stored in memory) being executed on it. The processing system 902 has access to a non-transitory computer-readable memory 906 in addition to one or more data stores 908. The one or more data stores 908 may contain first data 910 as well as second data 912.

FIG. 9B depicts another example system 920 that includes a client-server architecture. One or more clients 922 (e.g., user personal computer, workstation, etc.) accesses one or more servers 924 executing computer instructions of a module 926 (e.g., software module stored in memory) on a processing system 927 via one or more networks 928. The one or more servers 924 may access a non-transitory computer readable memory 930 as well as one or more data stores 932. The one or more data stores 932 may contain first data 934 as well as second data 936.

FIG. 9C shows a function block diagram of example hardware for a standalone computer architecture 950, such as the architecture depicted in FIG. 9A, that may be used to contain and/or implement the subject matter described herein. A bus 952 may serve as the information highway interconnecting the other illustrated components of the hardware. A processing system 954 labeled CPU (central processing unit) (e.g., one or more computer processors), may perform calculations and logic operations required to execute a program/software/module. A non-transitory computer-readable storage medium, such as read only memory (ROM) 956 and random access memory (RAM) 958, may be in communication with the processing system 954 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium thru communication port 978.

A disk controller 960 interfaces one or more optional disk drives to the system bus 952. These disk drives may be external or internal flash memory drives 965, external or internal CD-ROM, CD-R, CD-RW or DVD drives 964, or external or internal hard disk drives 966. As indicated previously, these various disk drives and disk controllers are optional devices.

If needed, the processor 954 may access each of the following components: real-time data buffer, conveyors, file input processor, database index shared access memory loader, reference data buffer and data managers. Each component may include a software application stored in one or more of the disk drives connected to the disk controller 960, the ROM 956 and/or the RAM 958.

A display interface 968 may permit information from the bus 952 to be displayed on a display 970 in audio, video, graphical, text, or alphanumeric format.

In addition to the standard computer-type components, the hardware may also include data input devices, such as a keyboard 972, or other input device 974, such as a microphone, remote control, pointer, mouse, touch screen, and/or joystick.

Figure 9D:
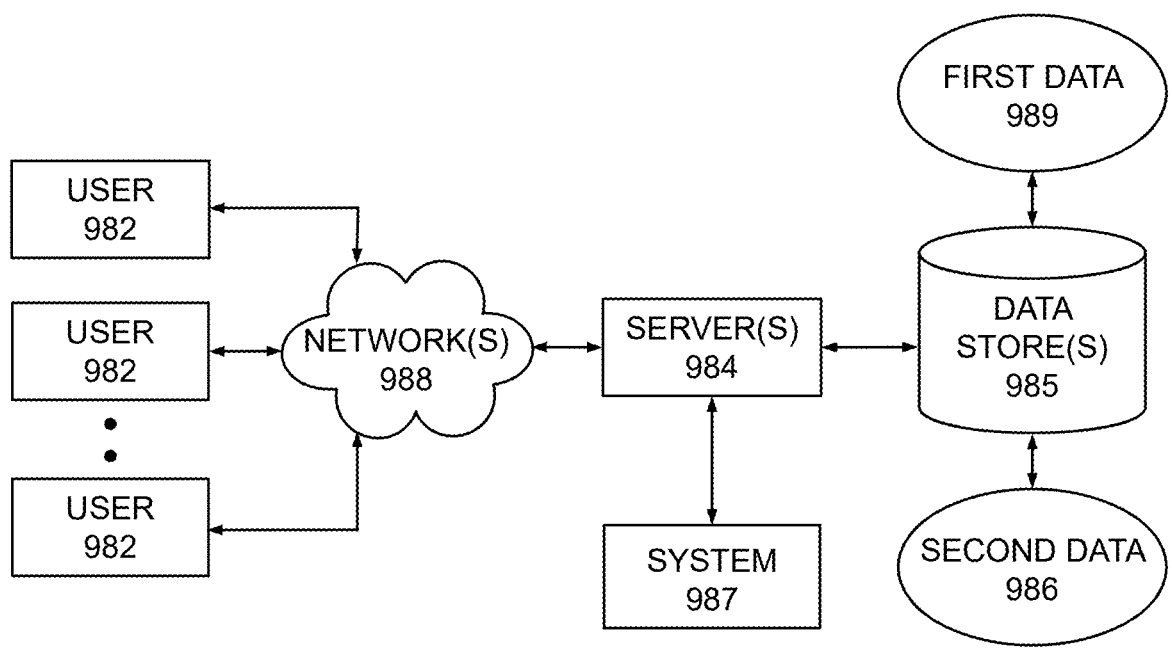
FIG. 9D is a block diagram illustrating an example computer-implemented environment.

FIG. 9D depicts a computer-implemented environment 980 wherein users 982 can interact with a system 987 hosted on one or more servers 984 through a network 988. The system 987 contains software operations or routines. The users 982 can interact with the system 987 through a number of ways, such as over one or more networks 988. One or more servers 984 accessible through the network(s) 988 can host the system 987. The processing system 987 has access to a non-transitory computer-readable memory in addition to one or more data stores 985. The one or more data stores 985 may contain a first data 989 as well as a second data 986. It should be understood that the system 987 could also be provided on a stand-alone computer for access by a user.

This written description describes example embodiments of the subject matter, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

Additionally, used herein, the terms "up", and "down" are intended to provide relative positions/locations for the purposes of description, and are not intended to designate an absolute frame of reference. Further, the order of blocks in process flowcharts or flow diagrams do not inherently indicate any particular order nor imply any limitations.

Although the subject matter has been described with reference to specific embodiments thereof, these embodiments are merely illustrative, and not restrictive of, the invention. Various modifications or changes to the specifically disclosed example embodiments will be suggested to persons skilled in the art. Whereas a simple example of a two-dimensional physical object has been shown and described, the subject matter has no such a restriction, for example, three-dimensional objects. Furthermore, whereas the sibling designs have been shown and described based on one example perturbation, other perturbations can be used for achieving the same. Additionally, whereas example physics informed basis functions have been shown and described based on results of a finite element analysis of a base design. Other analysis results may be used for achieving the same, for example, design sensitivity from a linear companion analysis, a weighting between structure and fluid results in a fluid-structure interaction analysis, dimensional analysis, etc. Furthermore, whereas each control point has been described and shown as one of the nodes that form a surface, control point can be located away from the surface and linked with the nodes with a mathematical relationship. Finally, design objective has been shown and described as minimizing displacement at a certain location of a structure, other physical characteristic can be used for achieving the same, for example, fatigue life, crack propagation, weighting of structural and fluid results in a fluid-structure interaction. In summary, the scope of the subject matter should not be restricted to the specific example embodiments disclosed herein, and all modifications that are readily suggested to those of ordinary skill in the art should be included within the spirit and purview of this application and scope of the appended claims.

What is claimed is:

1. A computer-implemented method comprising, by one or more processors:
    (a) receiving a model representing a base design for a physical object in a shape optimization according to a design objective, and one or more control points for altering a shape of the physical object, the shape defined by a set of nodes in the model;
    (b) performing a physics simulation with the base design to determine a set of physical behaviors of the base design, wherein the set of physical behaviors are associated with the design objective;
    (c) determining a physics informed basis function based upon the set of physical behaviors;
    (d) generating a set of sibling designs from the base design according to a perturbation scheme that is configured to perturb locations of the one or more control points and produce one or more perturbed control points;
    (e) using a shape change function, modifying the shape of each sibling design of the set of sibling designs to match the one or more perturbed control points of that sibling design, wherein:
        (i) the shape change function is modified by the physics informed basis function and normalized by a scale function;
        (ii) the shape change function is configured to match perturbed locations at the one or more control points and to approximate basic nodal location changes of the set of nodes; and
        (iii) the scale function is configured to match the value of the physics informed basis function at the one or more control points;
    (f) performing a physics simulation with each sibling design of the set of sibling designs to determine a set of physical behaviors of that sibling design, wherein the set of physical behaviors of that sibling design are associated with the design objective;
    (g) generating a surrogate model based on the sets of physical behaviors and the one or more control points of the set of sibling designs; the set of sibling designs;
    (h) using the surrogate model, determining optimal locations, for the design objective, of each of the one or more control points; and
    (i) creating an optimized model by updating the model representing the base design based on the determined optimal locations for each of the one or more control points and using the physics informed basis function.

2. The method of claim 1, wherein the set of nodes form a surface in the model.

3. The method of claim 2, wherein the perturbation scheme comprises perturbing the one or more control points along a direction normal to the surface at an original location in the model.

4. The method of claim 2, wherein the one or more control points belongs to the set of nodes.

5. The method of claim 1, wherein the shape change function interpolates or extrapolates the one or more perturbed control points to corresponding nodal location changes at the set of nodes.

6. The method of claim 5, wherein shape change function comprises a radial basis function with a center value adjusted to the respective perturbed value.

7. The method of claim 1, wherein the simulated physical behaviors of the physical object comprise internal energy density.

8. The method of claim 1, wherein the simulated physical behaviors of the physical object comprise principal stress.

9. The method of claim 1, wherein the simulated physical behaviors of the physical object comprise displacement.

10. The method of claim 1, wherein the design objective comprises a target physical characteristic of the physical object.

11. The method of claim 1, wherein the one or more simulated physical behaviors of the base design comprise design sensitivity information obtained in a companion linear analysis of the base design.

12. The method of claim 11, wherein the design sensitivity information is a gradient of the design objective with respect to the perturbed values.

* * * * *